(12) United States Patent
Allard et al.

(10) Patent No.: US 7,708,643 B2
(45) Date of Patent: May 4, 2010

(54) SAVING AUDIO SOURCE IDENTIFIERS FOR SOUNDTRACKS IN A GAMING SYSTEM

(75) Inventors: James E. Allard, Seattle, WA (US); Jeffrey S. Stone, Bellevue, WA (US); Tracy Sharpe, Seattle, WA (US); James N. Helm, Redmond, WA (US); Victor Keith Blanco, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 827 days.

(21) Appl. No.: 10/609,266

(22) Filed: Jun. 26, 2003

(65) Prior Publication Data

US 2004/0005923 A1    Jan. 8, 2004

Related U.S. Application Data

(63) Continuation-in-part of application No. 09/802,661, filed on Mar. 9, 2001, now abandoned.

(51) Int. Cl.
*A63F 9/24* (2006.01)
*A63F 13/00* (2006.01)
*G06F 17/00* (2006.01)
*G06F 19/00* (2006.01)

(52) U.S. Cl. ............... 463/43; 30/35; 30/40; 30/42; 30/44

(58) Field of Classification Search ............ 463/30, 463/35, 40, 42–44
See application file for complete search history.

(56) References Cited

U.S. PATENT DOCUMENTS

| | | | |
|---|---|---|---|
| 4,296,476 A | 10/1981 | Mayer et al. | |
| 4,432,067 A | 2/1984 | Nielsen | |
| 4,858,930 A | 8/1989 | Sato | |
| 4,905,280 A | 2/1990 | Wiedemer | |
| 5,359,510 A | 10/1994 | Sabaliauskas | |
| 5,362,068 A | 11/1994 | Liu | |

(Continued)

FOREIGN PATENT DOCUMENTS

CA      2201276      9/1998

(Continued)

OTHER PUBLICATIONS

"Tony Hawk Pro Skater 2: FAQ/Walkthrough", GameFAQs.com, Apr. 2001, <http://www.gamefaqs.com/computer/doswin/file/258826/9219>.*

(Continued)

*Primary Examiner*—Dmitry Suhol
*Assistant Examiner*—Jason Pinheiro

(57) ABSTRACT

In accordance with one aspect of saving audio source identifiers for soundtracks in a gaming system, an audio track is obtained from an audio source and the audio track is saved so that a copy of the audio track is available when the audio source is no longer accessible to a game console. The audio track is at least part of a user-created soundtrack and/or a user-selected soundtrack. The identifier of the audio source is also saved, and when a database containing meta data associated with the audio track is available, the meta data associated with the audio track is obtained from the database, based at least in part on the identifier saved on the storage device, and the obtained meta data is stored.

35 Claims, 16 Drawing Sheets

U.S. PATENT DOCUMENTS

| | | | |
|---|---|---|---|
| 5,382,983 A | 1/1995 | Kwoh et al. |
| 5,421,590 A | 6/1995 | Robbins |
| 5,459,487 A | 10/1995 | Bouton |
| 5,465,982 A | 11/1995 | Rebane |
| 5,475,835 A | 12/1995 | Hickey |
| 5,489,103 A | 2/1996 | Okamoto |
| 5,539,822 A | 7/1996 | Lett |
| 5,550,575 A | 8/1996 | West et al. |
| 5,551,701 A | 9/1996 | Bouton et al. |
| 5,556,107 A | 9/1996 | Carter |
| 5,557,541 A | 9/1996 | Schulhof et al. |
| 5,558,339 A | 9/1996 | Perlman |
| 5,587,546 A | 12/1996 | Kato et al. |
| 5,592,609 A | 1/1997 | Suzuki et al. |
| 5,592,651 A | 1/1997 | Rackman et al. |
| 5,598,276 A | 1/1997 | Cookson et al. |
| 5,611,066 A | 3/1997 | Keele et al. |
| 5,624,316 A | 4/1997 | Roskowski et al. |
| 5,630,754 A | 5/1997 | Rebane |
| 5,634,849 A | 6/1997 | Abecassis |
| 5,649,862 A | 7/1997 | Sakaguchi et al. |
| 5,659,742 A | 8/1997 | Beattie et al. |
| 5,680,323 A | 10/1997 | Barnard |
| 5,706,510 A | 1/1998 | Burgoon |
| 5,711,715 A | 1/1998 | Ringo et al. |
| 5,716,273 A | 2/1998 | Yuen |
| 5,726,909 A | 3/1998 | Krikorian |
| 5,735,744 A | 4/1998 | Okamoto |
| 5,745,574 A | 4/1998 | Muftic |
| 5,752,883 A | 5/1998 | Butcher et al. |
| 5,791,992 A | 8/1998 | Crump et al. |
| 5,797,752 A | 8/1998 | Umezawa |
| 5,798,921 A | 8/1998 | Johnson et al. |
| 5,841,979 A | 11/1998 | Schulhof et al. |
| 5,876,286 A | 3/1999 | Lee |
| 5,878,134 A | 3/1999 | Handelman et al. |
| 5,892,900 A | 4/1999 | Ginter et al. |
| 5,896,125 A | 4/1999 | Niedzwiecki |
| 5,915,238 A | 6/1999 | Tjaden |
| 5,917,256 A | 6/1999 | Broadbent, II |
| 5,918,223 A | 6/1999 | Blum et al. |
| 5,933,599 A | 8/1999 | Nolan |
| 5,935,005 A | 8/1999 | Tsuda et al. |
| 5,946,278 A | 8/1999 | Tower |
| 5,961,386 A | 10/1999 | Sawaguchi |
| 5,969,283 A | 10/1999 | Looney et al. |
| 5,973,683 A | 10/1999 | Cragun et al. |
| 5,978,920 A | 11/1999 | Lee |
| 5,980,261 A | 11/1999 | Mino et al. |
| 5,993,319 A | 11/1999 | Aoyama |
| 6,001,015 A | 12/1999 | Nishiumi et al. |
| 6,005,597 A | 12/1999 | Barrett et al. |
| 6,009,433 A | 12/1999 | Kurano et al. |
| 6,011,758 A | 1/2000 | Dockes et al. |
| 6,012,068 A | 1/2000 | Boezeman et al. |
| 6,015,344 A | 1/2000 | Kelly et al. |
| 6,025,869 A | 2/2000 | Stas et al. |
| 6,031,795 A | 2/2000 | Wehmeyer |
| 6,043,818 A | 3/2000 | Nakano et al. |
| 6,049,810 A | 4/2000 | Schwartz et al. |
| 6,065,020 A | 5/2000 | Dussud |
| 6,082,887 A | 7/2000 | Feuer |
| 6,093,880 A | 7/2000 | Arnalds |
| 6,115,079 A | 9/2000 | McRae |
| 6,119,116 A | 9/2000 | Rose |
| 6,122,617 A | 9/2000 | Tjaden |
| 6,128,255 A | 10/2000 | Yankowski |
| 6,128,625 A | 10/2000 | Yankowski |
| 6,147,696 A | 11/2000 | Smith et al. |
| 6,147,940 A | 11/2000 | Yankowski |
| 6,161,185 A | 12/2000 | Guthrie et al. |
| 6,173,294 B1 | 1/2001 | Azagury et al. |
| 6,181,336 B1 | 1/2001 | Chiu et al. |
| 6,186,896 B1 | 2/2001 | Takeda et al. |
| 6,189,096 B1 | 2/2001 | Haverty |
| 6,192,340 B1 | 2/2001 | Abecassis |
| 6,224,485 B1 | 5/2001 | Dickinson et al. |
| 6,230,320 B1 | 5/2001 | Gakumura |
| 6,251,012 B1 | 6/2001 | Horigami et al. |
| 6,280,327 B1 | 8/2001 | Leifer et al. |
| 6,280,329 B1 | 8/2001 | Kondo et al. |
| 6,298,441 B1 | 10/2001 | Handelman et al. |
| 6,299,535 B1 | 10/2001 | Tanaka |
| 6,309,301 B1 | 10/2001 | Sano |
| 6,312,336 B1 | 11/2001 | Handelman et al. |
| 6,338,680 B1 | 1/2002 | Connors |
| 6,352,479 B1 | 3/2002 | Sparks |
| 6,383,079 B1 | 5/2002 | Takeda et al. |
| 6,393,430 B1 * | 5/2002 | Van Ryzin ............... 707/104.1 |
| 6,396,531 B1 | 5/2002 | Gerszberg et al. |
| 6,439,956 B1 | 8/2002 | Ho |
| 6,461,242 B2 | 10/2002 | Takeda et al. |
| 6,464,585 B1 | 10/2002 | Miyamoto et al. |
| 6,468,160 B2 | 10/2002 | Eliott |
| 6,488,508 B2 | 12/2002 | Okamoto |
| 6,502,111 B1 | 12/2002 | Dussud |
| 6,510,440 B1 | 1/2003 | Alpern et al. |
| 6,535,269 B2 | 3/2003 | Sherman et al. |
| 6,599,194 B1 | 7/2003 | Smith et al. |
| 6,601,171 B1 | 7/2003 | Carter et al. |
| 6,676,520 B2 | 1/2004 | Nishiumi et al. |
| 6,712,704 B2 | 3/2004 | Eliott |
| 6,714,189 B2 | 3/2004 | Collins |
| 6,716,102 B2 | 4/2004 | Whitten et al. |
| 6,745,236 B1 | 6/2004 | Hawkins et al. |
| 6,769,989 B2 | 8/2004 | Smith et al. |
| 6,821,205 B2 | 11/2004 | Takahashi et al. |
| 6,875,021 B2 | 4/2005 | Okamoto |
| 6,928,433 B2 | 8/2005 | Goodman et al. |
| 6,935,952 B2 | 8/2005 | Walker et al. |
| 7,019,205 B1 | 3/2006 | Fujisawa et al. |
| 7,198,490 B1 | 4/2007 | Olsen |
| 7,303,476 B2 | 12/2007 | Blanco |
| 2001/0004609 A1 | 6/2001 | Walker et al. |
| 2001/0007824 A1 | 7/2001 | Fukuda |
| 2002/0059114 A1 | 5/2002 | Cockrill et al. |
| 2002/0077177 A1 | 6/2002 | Elliott |
| 2002/0121297 A1 | 9/2002 | Li et al. |
| 2002/0152377 A1 | 10/2002 | Bauman et al. |
| 2003/0008715 A1 | 1/2003 | Huber et al. |
| 2003/0077557 A1 | 4/2003 | Okamoto |
| 2003/0078097 A1 | 4/2003 | Okamoto |
| 2003/0227473 A1 * | 12/2003 | Shih et al. .................... 345/716 |
| 2004/0005924 A1 | 1/2004 | Watatbe et al. |
| 2004/0162137 A1 | 8/2004 | Eliott |
| 2008/0045337 A1 | 2/2008 | Blanco |

FOREIGN PATENT DOCUMENTS

| | | |
|---|---|---|
| DE | 100 46 437 | 4/2002 |
| EP | 0 809 214 A | 11/1997 |
| EP | 0889420 | 1/1999 |
| EP | 0 998 966 A | 5/2000 |
| EP | 1 035 706 | 9/2000 |
| EP | 1035706 | 9/2000 |
| EP | 1126425 | 8/2001 |
| FR | 2 743 434 A | 7/1997 |
| JP | 3135636 | 6/1991 |
| JP | 7160467 | 6/1995 |
| JP | 7249283 | 9/1995 |
| JP | 8016554 | 1/1996 |
| JP | 10243015 | 9/1998 |
| JP | 10327147 | 12/1998 |
| JP | 11-000468 | 1/1999 |

| | | |
|---|---|---|
| JP | 11207034 | 8/1999 |
| JP | 11237941 | 8/1999 |
| JP | 11317061 | 11/1999 |
| JP | 2000107449 | 4/2000 |
| JP | 2000149386 | 5/2000 |
| JP | 2000157724 | 6/2000 |
| JP | 2000218035 | 8/2000 |
| JP | 2000228051 | 8/2000 |
| JP | 2000511378 T | 8/2000 |
| JP | 2000348466 | 12/2000 |
| WO | WO9714151 | 4/1997 |
| WO | WO 98/56179 | 12/1998 |
| WO | WO0033572 | 6/2000 |
| WO | WO 00/40027 | 7/2000 |
| WO | WO0051036 | 8/2000 |
| WO | WO 00/51036 | 9/2000 |
| WO | WO 01/05477 | 1/2001 |
| WO | WO0105477 | 1/2001 |
| WO | WO 01/08148 | 2/2001 |
| WO | WO0108148 | 2/2001 |
| WO | WO 01/84768 | 11/2001 |
| WO | WO0183055 A3 | 11/2001 |
| WO | WO0184768 | 11/2001 |

OTHER PUBLICATIONS

"Extract, Encode and Tag an MP3 in One Step: N2MP3 Reviewed", Macobserver.com, Apr. 11, 2000, <http://web.archive.org/web/20000411120509/http://www.macobserver.com/newreviews/bc/00/000225n2mp3/n2mp3.html>.*

Dean Takahashi, "Microsoft goes gaming.( Product Development)," Electronic Business, May 2000, 2 pages.

Press Pass, "Xbox to Deliver Ultimate Console Gaming Experience," San Jose, Calif., Mar. 10, 2000, 3 pages, 2001.

IGN.com, "What is the 64DD?," Sep. 17, 1997, 9 pages.

IGN.com, "The 64DD: Nintendo's Disk Drive,-Everythingyou ever wanted to know about the N64's first major add-on," Jan. 28, 1998, 7 pages.

IGN.com, "The 64DD Connection- Here's how the 64DD and the Nintendo 64 connect," Oct. 20, 1999, 5 pages.

IGN.com,"IGN64's Ultimate 64DD FAQ- Everything you ever wanted to know about the upcoming disk drive add-on. Updated: Dec. 13," Dec. 15, 1999, 12 pages.

c/net News.com, "U.S. version of Playstation2 to have modem, hard drive," by Bloomberg News, Apr. 14, 2000, 2 pages.

ZDNetUK News, Rick Lehrbaum, LinuxDevices.com, Special to ZDNet, "Linux fuels game console plus," Jul. 7, 2000, 3 pages.

CNET Gamecenter.com, Todd Mowatt, Indrema: Linux-Based Console, Aug. 11, 2000, 2 pages.

Planet GeForce,"Interviews-John Gildred of Indrema on the L600," Interviewed by Christopher "Razor" Gordon, Oct. 19, 2000, 5 pages.

Links 386CD, 1995, Access Software, Inc., pp. 1-87.

Web page printout, Daily Radar.com; Nov. 13, 2000; Review of "Metropolis Street Racer" game, 5 pages.

User Manual, "Metropolis Street Racer" game, SEGA Enterprises, Ltd., 2000, 18 pages.

Stallings; "Cryptography and network security: Principles and Practice"; Second Edition, Prentice Hall 1999; pp. 330 and 333-338.

Melissa J Perenson, "Play Back Media Your Way" PC World 'Online! Jun. 1, 2000 Retrieved form the Internet: url:http://www.pcworld.com/resource/printable/0aid1700100.asp. retrieved on Jul. 8, 2004.

Paul Thurrott, "Windows Media Player 7 reviewed" Winsupersite 'Online! Aug. 15, 2000 Retireved formt he internet: URL:http://www.winsupersite.com/reviews/wmp7.asp> retrieved on Jun. 18, 2004.

"CES: Bill Gates zeigt die Xbox" Golem.de 'Online! Jan. 6, 2000 Retrieved from the internet: url:http://dyn1.golem.de/cgi-bin/usisapi.dl1/forprint??id11561> retrieved Jun. 18, 2004.

"PlayStation 2 Instruction Manual" 'Online! 2000 Sony Computer Entertainment Retrieved from the internet: url:www.playstation.com. retrieved on Jun. 18, 2004.

PS2 Frequently Asked Questions All Playstation2 'Online! Jul. 29, 2000 Retrieved from the Internet: URL:http://www.allps2.net/ps2_faq.html> retrieved on Jun. 18, 2004.

Greg Suarez, "Sony PlayStation 2" The Digital Bits 'Online! Nov. 15, 2000 retrieved from the internet: URL:http://www.thedigitalbits.com/reviews/ps2/sonyps2*.html> retrieved on Jun. 18, 2004.

Unknown, "Dex Drive Manual", Gameshark, 'Online! 1998, pp. 1-15.

Quinlan, Daniel, "Filesystem Hierarchy Standard -Version 2.0", 'Online! Oct. 26, 1997, 39 pages.

Jones: "Garbage Collection", pp. 171-173, Inter-Generational Pointers.

"DFU Verbindung herstellen" FAQ, 'Online! XP002318226 Retrieved from the Internet: URL:www.puretec.de> retrieved on 2000!, 1 page.

Sherman, S.A. et al., "Secure network Access Using Multiple Applications of AT&T's Smart Card", AT&T Technical Journal, American Telephone and Telegraph Co. New York, US, vol. 73, No. 5, Sep. 1, 1994, pp. 61-72, XP000475912 ISSN: 8756-2324.

English language Title and Abstract for DE10046437 Foreign Patent Document, 1 page.

English language Title and Abstract for EP1035706 Foreign Patent Document, 1 page.

Schneier, B. "Applied Cryptography", Applied Cryptography. Protocols, Algorithms and Source Code in C, New York, John Wiley & Sons, US, 1996, pp. 574-577.

Schneier, "Applied Cryptography," John Wiley & Sons, Second Edition, 1996, pp. 32 and 33.

Getting Started Windows98, 2nd Edition, Microsoft Corporation, pp. 80-81 and 87-90.

Hall et al., "Remote Electronic Gambling" Computer Security Applications Conference, 1997. Proceedings., 13th Annual Dec. 8-12, 1997 pp. 232-238.

Jimbo et al., "Optimal Authentication Systems and Combinatorial Designs" Information Theory, IEEE Transactions on vol. 36, Issue 1, Jan. 1990 pp. 54-62.

Nacira et al., "Secured Net-BANKING by /spl thera/-VIGENERE in Syverson's Protocol" Computer Systems and Applications, 2005. The 3rd ACS/IEEE International Conference on 2005. p. 67.

"TV Incapable of Displaying Images", Nikkel Electronics, May 22, 2000 Issue, Japan, Nikkei Business Publications, Inc., May 22, 2000, No. 770, pp. 141-158.

"PlayStation 2, Dreamcast, and 64DD: Aiming at Increasing Customers by Integration with the Net", Nikkei Trendy, No. 169, Japan, Nikkei Home Publishing Inc., Jul. 25, 2000, Extra Edition/Serial No. 169, pp. 16-19.

"XBOX, ASCII, the March issue, 2001 (The Anatomy of XBOX which is Inaccessable to the Readers of Game Magazines: The Latest information of the War for TV Viewers at the Present Stage in 21st Century", ASCII Corporation., Mar. 1, 2001, vol. 25, No. 3, pp. 249-264.

U.S. Appl. No. 60/201,163, filed May 2, 2000, Shih, et al., "Real Time Incorporation of Personalized Audio into Video Game".

U.S. Appl. No. 60/252,760, filed Nov. 22, 2000, Shih, et al., "Real Time Incorporation of Personalized Audio into Video Game".

Bolosky et al., "Single Instance Storage in Windows 2000" Proceedings of the Usenix Windows Systems Symposium, vol. 4, Aug. 3, 2000, pp. 13-21.

"Sega Dreamcast User Manual", retrieved on Oct. 16, 2006 at <<http://www/gamemanuals.net/download/11eed12c65503f83e99b0c58bd7450bd/Dreamcast_(EN)_[Hardware].pdf>>, The Game Manual, Sep. 9, 1999, pp. 2-31.

"The 64DD: Nintendo's Disk Drive", (Jan. 28, 1998).

Sega of America, Inc., ""The Game Manual Sega Dreamcast"", www.sega.com, 30 pages.

"Real time incorporation of personalized audio into video game",U. S. Appl. No. 60/201,163, filed May 2, 2000.

""The 64DD: Nintendo's disk drive"", ign.com, (Jan. 28, 1998).

"IGN64's ultimate 64DD FAQ", ign.com, (Dec. 15, 1999).

""What is the 64DD?"", ign.com, (Sep. 17, 1997).

"User manual "Metropolis Street Racer"", www.replacementdocs.com, (Jul. 9, 2006).

"Review of "Metropolis street racer"", dailyradar.com, (Nov. 13, 2000).

Microsoft Help and Support, "Control Panel Options", http://support.microsoft.com/kb/835644/en-us, (Jul. 8, 2008).

Microsoft, "More than 200 PC Manufacturers Deliver Windows 98 on New Consumer Machines", http://www.microsoft.com/presspass/press/1998/jun98/availpr.mspx, (Jun. 25, 1998).

"BPAI Decision", U.S. Appl. No. 09/802,504, (Feb. 19, 2009), 10 pages.

"Non final Office Action", U.S. Appl. No. 11/082,452, (Feb. 11, 2009),38 pages.

"Non Final Office Action", U.S. Appl. No. 11/0082,457, (Feb. 6, 2009),41 pages.

"Non Final Office Action", U.S. Appl. No. 10/778,565, 12 [pages.

"Foreign Appeal Decision", Application Serial No. 2002-048648, (Mar. 24, 2009),6 pages.

"Final Office Action", U.S. Appl. No. 11/082,452, (Aug. 12, 2009),12 pages.

"Non-Final Office Action", U.S. Appl. No. 11/082,453, (Aug. 12, 2009),9 pages.

* cited by examiner

1502

| SOUNDTRACK1 | |
|---|---|
| TRACK 1 | 4:10 |
| TRACK 2 | 7:57 |
| TRACK 3 | 9:28 |
| TRACK 4 | 2:43 |
| TRACK 5 | 6:14 |
| TRACK 6 | 1:59 |
| TRACK 7 | 3:35 |
| TRACK 8 | 3:47 |

| SOUNDTRACK1 | |
|---|---|
| ALL THE WORLD | 4:10 |
| LAUGHING | 7:57 |
| LONG RIDE | 9:28 |
| ABOVE IT ALL | 2:43 |
| NOWHERE LEFT | 6:14 |
| ASK ANYONE | 1:59 |
| TOUGH RIDE | 3:35 |
| SUNSET | 3:47 |

*Fig. 17B*

SAVING AUDIO SOURCE IDENTIFIERS FOR SOUNDTRACKS IN A GAMING SYSTEM

RELATED APPLICATIONS

This application is a continuation-in-part of U.S. patent application Ser. No. 09/802,661 filed Mar. 9, 2001 now abandoned, U.S. Publication No. 20020128067, entitled "Method and Apparatus for Creating and Playing Soundtracks in a Gaming System" (currently pending).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to gaming systems and, more particularly, to saving audio source identifiers for soundtracks in a gaming system.

BACKGROUND

Gaming systems currently available on the market are capable of playing game discs, music CDs, and movie DVDs from a disc drive. For example, the Playstation® 2 gaming system from Sony Corporation provides the ability to play games, music, and video titles from a disc inserted in the console. Certain gaming systems also provide a modem or other mechanism for establishing an online connection to facilitate online gaming.

Current gaming systems play games that typically include a game soundtrack. The game soundtrack is stored on a disc along with the game (i.e., a game disc). This game soundtrack includes music that is created by or selected by the game developer. If the user of the gaming system dislikes the game soundtrack or grows tired of the same soundtrack being played repeatedly, some gaming systems allow the user to launch the game from the game disc, and then replace the game disc with an audio CD that is played by the gaming system while the game is executed. However, if the game requires additional information from the game disc (e.g., when changing from one level to another), the user must remove the audio CD and re-insert the game disc. After the additional information has been retrieved from the game disc, the game disc can be removed from the gaming system and replaced with the audio CD. This switching of discs disrupts the gaming experience and is a nuisance to the user.

An additional problem that some gaming systems have is that such soundtracks frequently do not display user-friendly information. For example, the titles of songs in a soundtrack are often not displayed to the user. This lack of display of information is cumbersome to the user as it makes it more difficult for the user to identify which songs are in which soundtracks.

The saving of audio source identifiers for soundtracks in a gaming system described herein reduces these and other problems.

SUMMARY

Saving audio source identifiers for soundtracks in a gaming system is described herein.

According to one aspect, an audio track is obtained from an audio source and saved so that a copy of the audio track is available when the audio source is no longer accessible to the game console. The audio track is at least part of a user-created soundtrack and/or a user-selected soundtrack. The identifier of the audio source is saved, and when a database containing meta data associated with the audio track is available, the meta data associated with the audio track is obtained from the database, based at least in part on the identifier saved on the storage device, the obtained meta data is stored According to another aspect, a process includes obtaining an audio track from a source and saving the audio track on a storage device of a game console. An identifier of the source is also saved on the storage device. The process waits for a future application to be subsequently installed on the game console. After the future application is installed on the game console, the process includes using the saved identifier to obtain meta data associated with the audio track from a database and store the meta data associated with the audio track on the storage device

BRIEF DESCRIPTION OF THE DRAWINGS

FIGS. 17A and 17B illustrate example screens displayed to identify the audio tracks in a soundtrack.

DETAILED DESCRIPTION

The method and apparatus discussed herein allows users to create and play soundtracks in a gaming system. A soundtrack can be played by itself or played at the same time a game is executed, thereby replacing the soundtrack provided with the game. The soundtrack is created by copying audio data (or audio tracks) from one or more audio sources and storing the audio data as a soundtrack on a hard disk drive. An identifier of the source(s) may also be stored on the hard drive so that meta data, such as song titles for audio tracks, can be subsequently retrieved and used by the gaming system. The audio sources may include audio CDs, audio DVDs, game discs, and online sources that contain music files available for download. Since the soundtrack is played from the hard disk drive, it is not necessary to remove the game disc or other media from the gaming system prior to playing the soundtrack.

Figure 1:
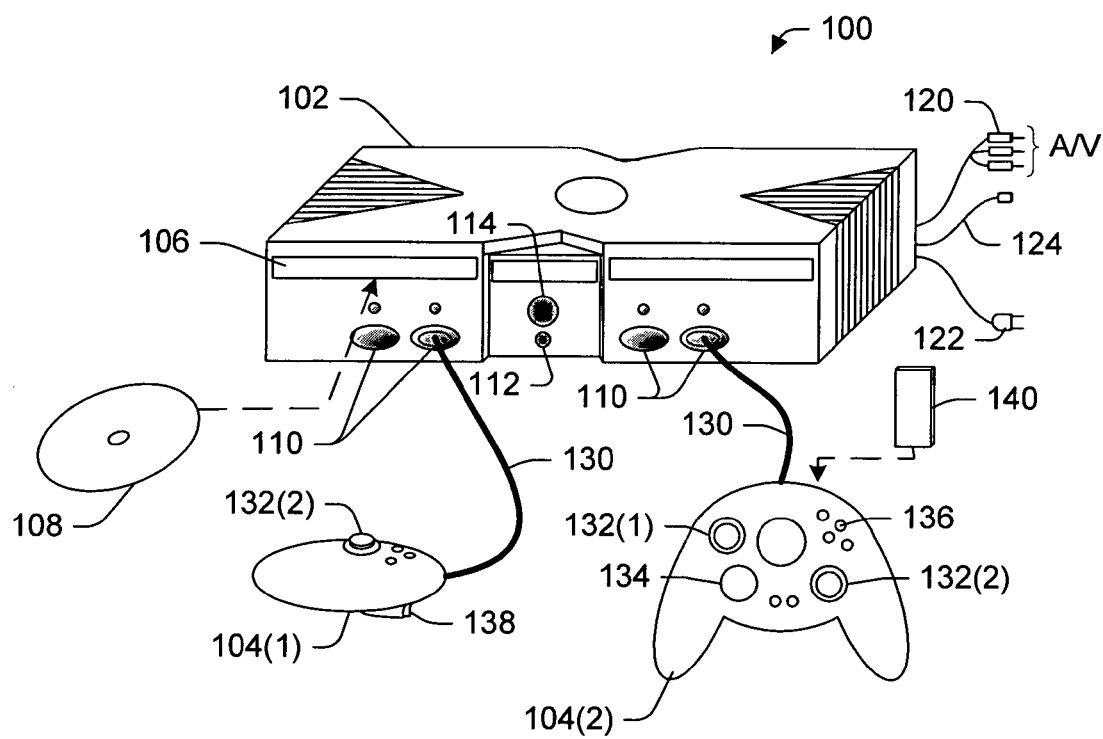
FIG. 1 illustrates a gaming system that implements a uniform media portal architecture.

FIG. 1 shows an example gaming system 100. It includes a game console 102 and up to four controllers, as represented by controllers 104(1) and 104(2). The game console 102 is equipped with an internal hard disk drive and a portable media drive 106 that supports various forms of portable storage media as represented by optical storage disc 108. Examples of suitable portable storage media include DVD, CD-ROM, game discs, and so forth.

The game console 102 has four slots 110 on its front face to support up to four controllers 104, although the number and arrangement of slots may be modified. A power button 112 and an eject button 114 are also positioned on the front face of the game console 102. The power button 112 switches power to the game console and the eject button 114 alternately opens and closes a tray of the portable media drive 106 to allow insertion and extraction of the storage disc 108.

The game console 102 connects to a television or other display (not shown) via A/V interfacing cables 120. A power cable 122 provides power to the game console. The game console 102 may further be configured with broadband capabilities, as represented by the cable or modem connector 124 to facilitate access to a network, such as the Internet.

Each controller 104 is coupled to the game console 102 via a wire or wireless interface. In the illustrated implementation, the controllers are USB (Universal Serial Bus) compatible and are connected to the console 102 via serial cables 130. The controller 102 may be equipped with any of a wide variety of user interaction mechanisms. As illustrated in FIG. 1, each controller 104 is equipped with two thumbsticks 132(1) and 132(2), a D-pad 134, buttons 136, and two triggers 138. These mechanisms are merely representative, and other known gaming mechanisms may be substituted for or added to those shown in FIG. 1.

A memory unit (MU) 140 may be inserted into the controller 104 to provide additional and portable storage. Portable memory units enable users to store game parameters and port them for play on other consoles. In the described implementation, each controller 104 is configured to accommodate two memory units 140, although more or less than two units may be employed in other implementations.

The gaming system 100 is capable of playing, for example, games, music, and videos. With the different storage offerings, titles can be played from the hard disk drive or the portable medium 108 in drive 106, from an online source, or from a memory unit 140. A sample of what the gaming system 100 is capable of playing back include:

1. Game titles played from CD and DVD, from the hard disk drive, or from an online source.
2. Digital music played from a CD in the portable media drive 106, from a file on the hard disk drive (e.g., Windows Media Audio (WMA) format), or from online streaming sources.
3. Digital audio/video played from a DVD disc in the portable media drive 106, from a file on the hard disk drive (e.g., Active Streaming Format), or from online streaming sources.

Figure 2:
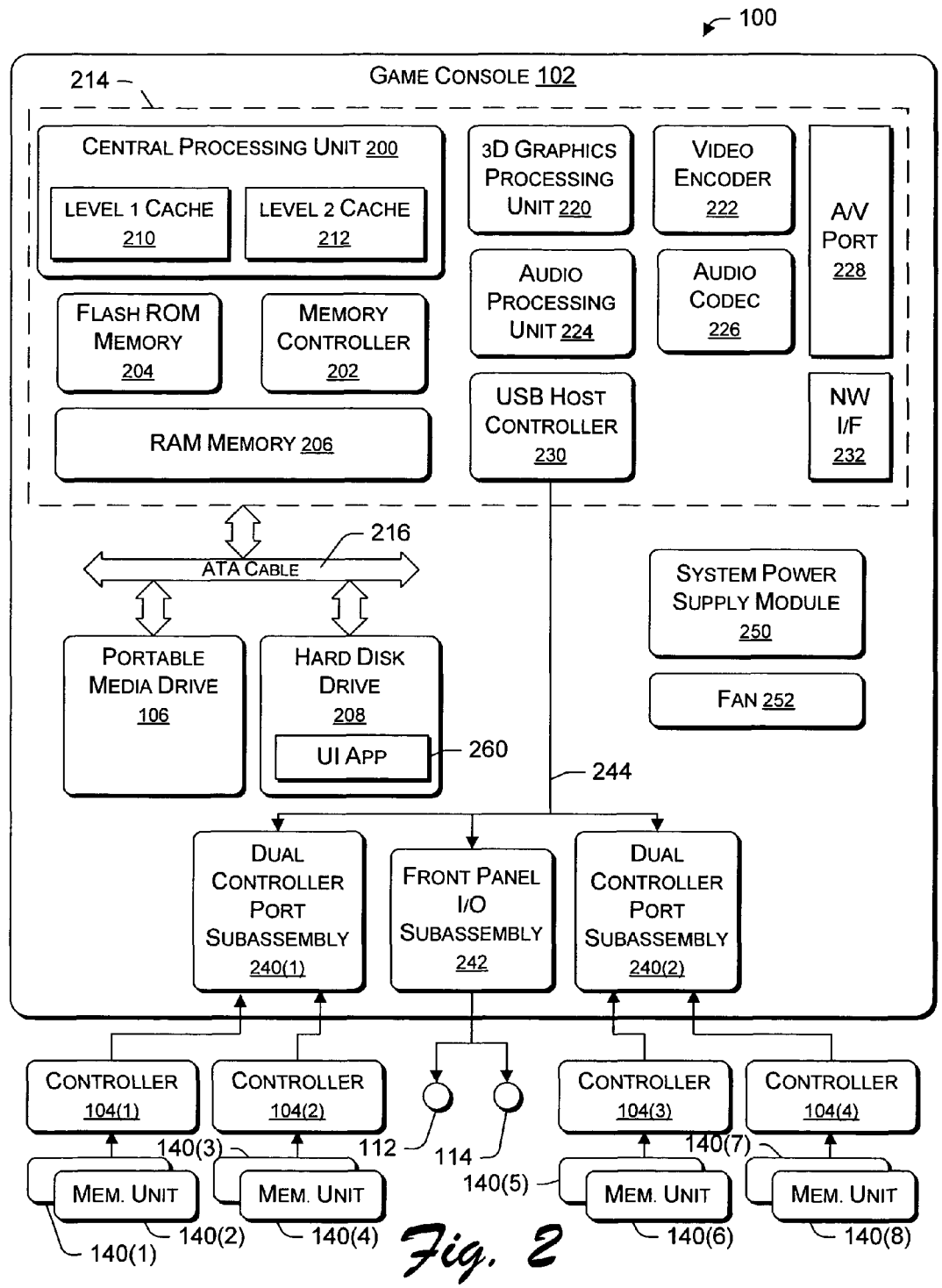
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106.

The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, also known as a Mezzanine bus.

As one suitable implementation, the CPU 200, memory controller 202, ROM 204, and RAM 206 are integrated onto a common module 214. In this implementation, ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., Internet, home network, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting two game controllers 104(1)-104(4). A front panel I/O subassembly 242 supports the functionality of the power button 112 and the eject button 114, as well as any LEDs (light emitting diodes) or other indicators exposed on the outer surface of the game console. The subassemblies 240(1), 240 (2), and 242 are coupled to the module 214 via one or more cable assemblies 244.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202.

A system power supply module 250 provides power to the components of the gaming system 100. A fan 252 cools the circuitry within the game console 102.

The game console 102 implements a uniform media portal model that provides a consistent user interface and navigation hierarchy to move users through various entertainment areas. The portal model offers a convenient way to access content from multiple different media types—game data, audio data, and video data—regardless of the media type inserted into the portable media drive 106.

To implement the uniform media portal model, a console user interface (UI) application 260 is stored on the hard disk drive 208. When the game console is powered on, various portions of the console application 260 are loaded into RAM 206 and/or caches 210, 212 and executed on the CPU 200. The console application 260 presents a graphical user interface that provides a consistent user experience when navigating to different media types available on the game console.

The gaming system 100 may be operated as a standalone system by simply connecting the system to a television or other display. In this standalone mode, the gaming system 100 allows one or more players to play games, watch movies, or listen to music. However, with the integration of broadband connectivity made available through the network interface 232, the gaming system 100 may further be operated as a participant in a larger network gaming community.

Figure 3:
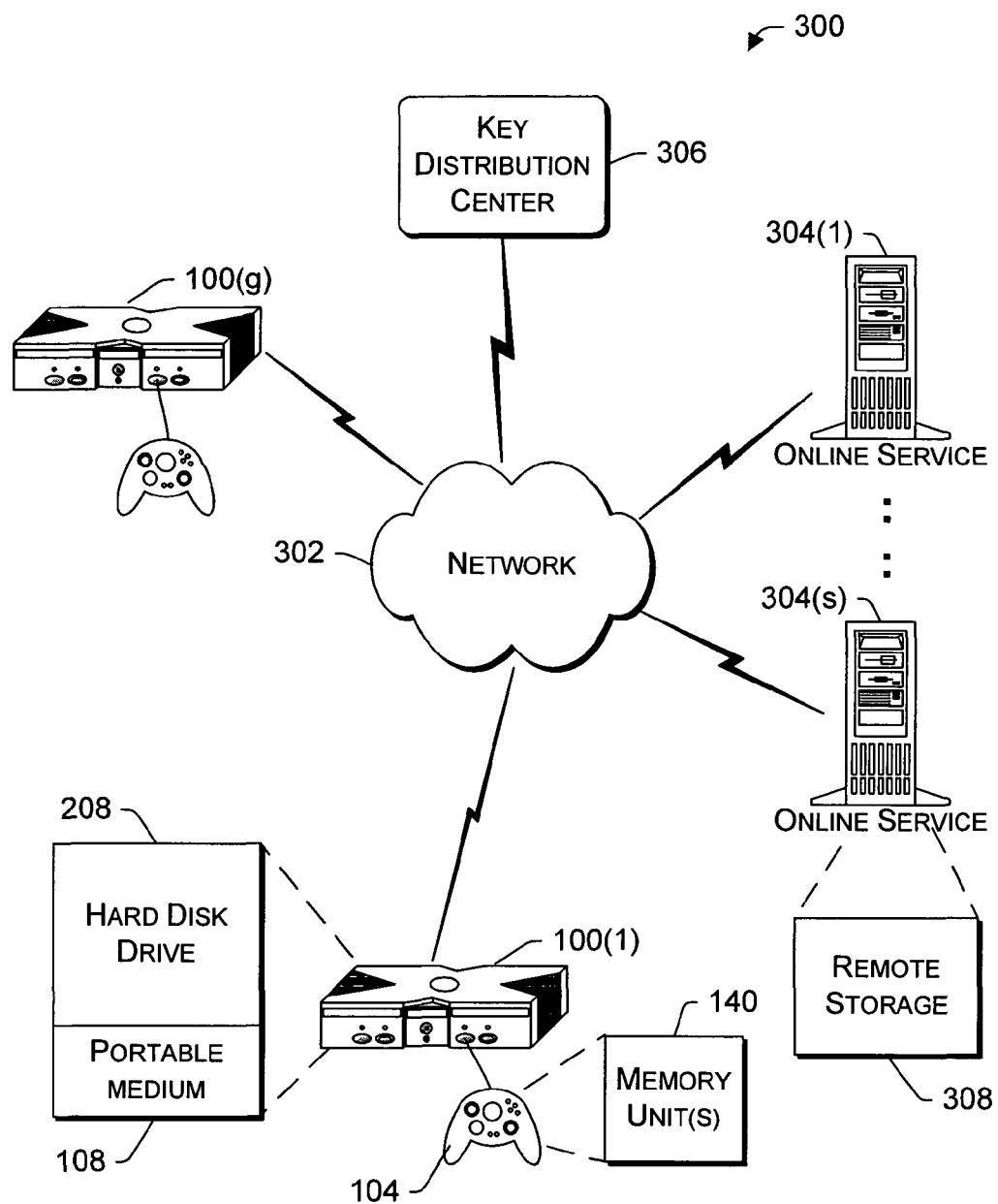
FIG. 3 illustrates a network gaming system in which the FIG. 1 gaming system is connected via a network to other consoles and services.

FIG. 3 shows an example network gaming environment 300 that interconnects multiple gaming systems 100(1), . . . , 100(g) via a network 302. The network 302 represents any of a wide variety of data communications networks. It may include public portions (e.g., the Internet) as well as private portions (e.g., a residential Local Area Network (LAN)), as well as combinations of public and private portions. Network 302 may be implemented using any one or more of a wide variety of conventional communications media including both wired and wireless media. Any of a wide variety of communications protocols can be used to communicate data via network 302, including both public and proprietary protocols. Examples of such protocols include TCP/IP, IPX/SPX, NetBEUI, etc.

In addition to gaming systems 100, one or more online services 304(1), . . . , 304(s) may be accessible via the network 302 to provide various services for the participants, such as hosting online games, serving downloadable music or video files, hosting gaming competitions, serving streaming audio/video files, and the like. The network gaming environment 300 may further involve a key distribution center 306 that plays a role in authenticating individual players and/or gaming systems 100 to one another as well as online services 304. The distribution center 306 distributes keys and service tickets to valid participants that may then be used to form games amongst multiple players or to purchase services from the online services 304.

The network gaming environment 300 introduces another memory source available to individual gaming systems 100—online storage. In addition to the is portable storage medium 108, the hard disk drive 208, and the memory unit(s) 140, the gaming system 100(1) can also access data files available at remote storage locations via the network 302, as exemplified by remote storage 308 at online service 304(s).

Figure 4:
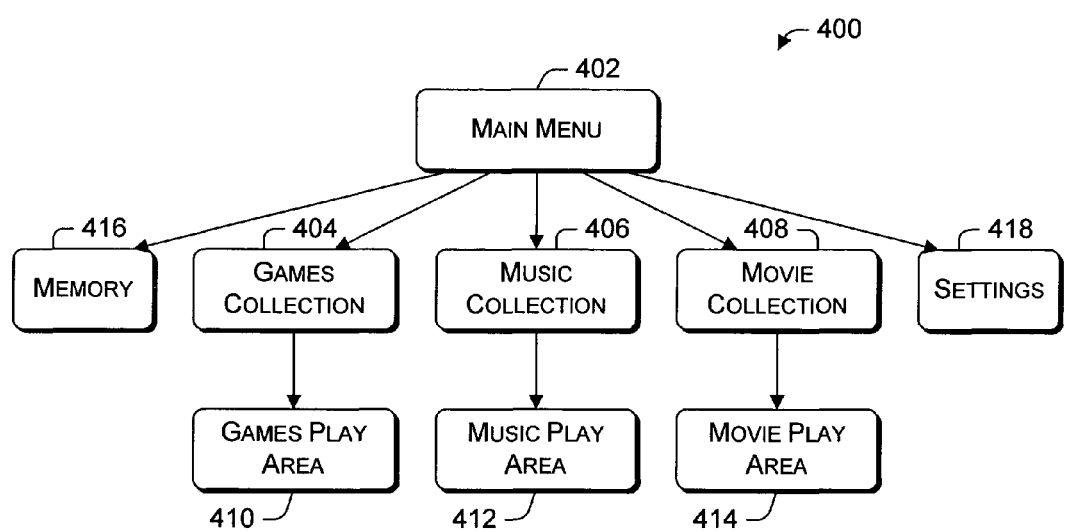
FIG. 4 illustrates a navigation hierarchy employed by the gaming system.

FIG. 4 shows the uniform media portal model 400. It provides a main menu 402 that acts as a common interface for multiple media types, including game media, movie media, and music media. The main menu 402 presents the user with a set of navigation choices that accurately describe what they would like to interact with on their console. This top-level menu is a simple representation of the three primary entertainment areas available on the console, thus presenting the following choices:

Games: This entertainment area pertains to a user's game experience and gaming media.
Music: This entertainment area is dedicated to the music context and audio media.
Movies: This entertainment area relates to a user's movie experience and video media.

The model's navigation hierarchy follows the media theme. Beneath the main menu 402 are collections of titles that pertain to their particular media types currently available to the user. In this example, a user can navigate from the main menu 402 to a games collection 404 that lists currently available game titles. Navigation may also be made to a music collection 406 that groups available music titles and a movie collection 408 that groups available movie titles. By constructing the hierarchy in terms of media type, the user is intuitively presented with titles within any given entertainment area. The titles within the various areas may be stored in any one of many storage locations, but such detail is not immediately revealed. Thus, the uniform media portal model 400 offers a coherent way to access multiple media types regardless of the media type inserted into the gaming system's portable media drive.

Area specific features, such as high scores on a game or creating a soundtrack, are left for lower levels of the model 400. Thus, beneath each collection is the specific play area that pertains to the particular media experience. A games play area 410 is navigated through the games collection 404, a music play area 412 is accessed through the music collection 406, and a movies play area 414 is navigated through the movie collection 408. This organization of the model allows users to select the context of the media type. This model thus provides a high-level "filter" on the kinds of media available on the console, and what operations may be performed with respect to the media.

The model 400 also accommodates system areas, including a memory area 416 and a settings area 418. The memory area 416 allows users to view memory contents and manage the memory devices in the console. The settings area 418 allows users to preview currently set options, as well as adjust the settings as desired.

The console application 260, which implements the uniform media portal model 400, is stored in the hard disk drive 208 of the console 102. The console application 260 is loaded each time the console is powered on. When power is initially applied and before presenting the main menu or loading a title, the console application 260 runs through an initialization cycle.

Figure 5:
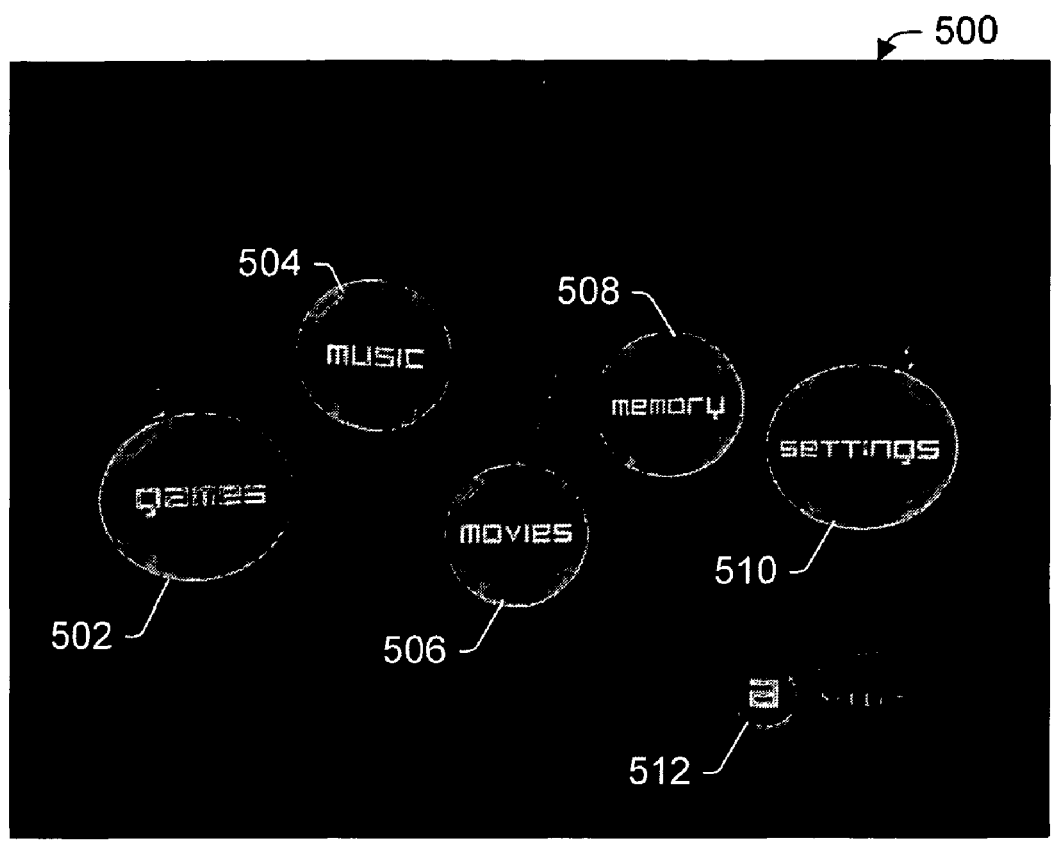
FIG. 5 illustrates a graphical user interface depicting the main menu of the gaming system.

FIG. 5 illustrates an example graphical user interface 500 depicting the main menu of the gaming system. The main menu UI 500 is generated by the console UI application 260 and depicted on the television or other display. The main menu UI 500 contains the five menu elements: a games element 502, a music element 504, a movies element 506, a memory element 508, and a setting element 510. These elements provide the navigation entry points for the five levelone areas of the uniform media portal model 400, namely, the games collection 404, the music collection 406, the movie collection 408, the memory 416, and the settings 418. Environmental background audio may be played when entering the main menu to further enhance the user environment.

The focus on the main menu UI 500 is initially placed on the games element 502, but other default positions may be alternatively employed. Any of the four controllers 104(1)-104(4) may be used to navigate the console user interface. The main menu is navigated from left to right with any of the connected controller thumbsticks. "D-pad" and left analog thumbstick actions are treated the same. The console UI application 260 recognizes all button presses and thumbstick movements from every controller 104, so moves from multiple thumbsticks simultaneously may result in a "tug-of-war" navigation. In one implementation, the navigation does not wrap once the user has reached the far left or right extent of the main menu UI 500, thus attempting to move right once the user has reached the settings element 510 or to move left once the user has reached the games element 502 will have no effect.

A select element 512 allows the user to select the focused element from among the five main menu elements 502-510. The "A" button on the controller is used to control the select element 512, and hence the graphical select element 512 illustrates an "a" within the element. Upon selection, the console UI application navigates to the selected area.

Figure 6:
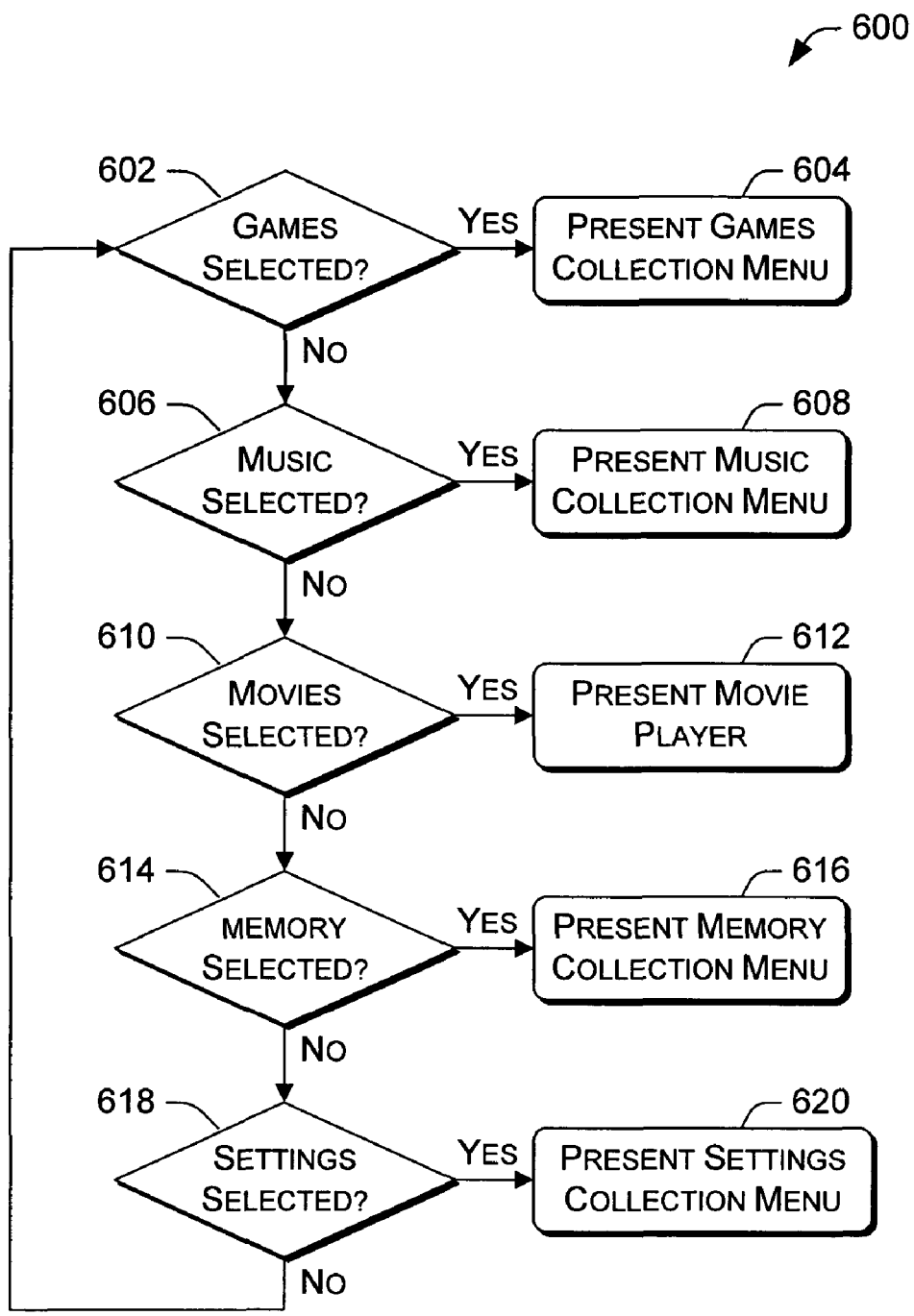
FIG. 6 is a flow diagram of the main menu navigation process that is performed after the gaming system is initialized.

FIG. 6 is a flow diagram of the main menu navigation process 600 that is performed after the gaming system is initialized. The process 600 is implemented in software as computer-executable instructions that are executed by the CPU 200 to perform the operations illustrated as blocks. The process generally discerns which main menu element is selected and navigates to the selected area.

At block 602, the console application 260 determines whether the games element 502 is selected. If so (i.e., the "Yes" branch from block 602), the console application 260 navigates to the games collection 404 and presents a games collection menu (block 604). If the games element is not selected, block 606 determines whether the music element 504 is selected. If the music element 504 is selected, the console UI application 260 navigates to the music collection 406 and presents a music collection menu (block 608). As discussed below, the music collection menu includes options to create, edit, and play soundtracks through the gaming system.

If the movies element 506 is selected (block 610), the console UI application 260 navigates to the movies collection 408 and presents a movie player (block 612). If the memory element 508 is selected (block 614), the console UI application 260 navigates to the memory area 416 and presents a memory collection menu (block 616). Finally, if the settings element 510 is selected (block 618), the console UI application 260 navigates to the settings area 418 and presents a settings collection menu (block 620).

Figure 7:
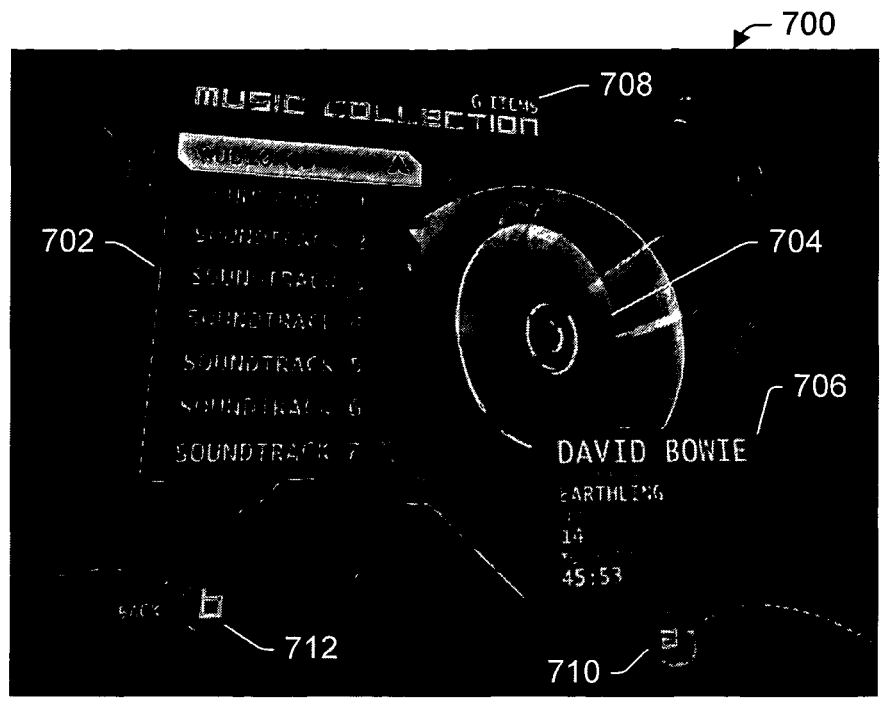
FIG. 7 illustrates a graphical user interface depicting a music collection menu that is accessible from the main menu.

FIG. 7 illustrates a graphical user interface depicting a music collection menu 700 that is presented upon selection of the music element 504 in the main menu UI 500 (FIG. 5). The music collection is the area where the user can select from available audio discs in the portable media drive 106 as well as soundtracks they have previously created and stored on the hard disk drive 208. The music collection menu 700 includes a list 702 of the available audio discs in the portable media drive (if any) and soundtrack files on the hard disk drive. An example of a suitable audio disc is a Redbook audio CD (compact disc). An example of a suitable soundtrack file is one or more WMA files copied from an audio CD, an audio DVD, a game disc, an online source, or other audio source.

An orb 704 contains a graphic of the currently selected audio item and a meta data panel 706 posts information about the current audio element. As the user navigates over the list 702 of the available audio discs and soundtracks, corresponding summary information is posted in the meta data panel 706. The following information is displayed for the currently selected audio disc or soundtrack:

Name of the audio element as it appears in the list
Total number of tracks
Total playing time for the audio element in minutes and seconds In this example, the audio CD is highlighted in list 702 and hence a CD image is presented in orb 704. As indicated by the meta data panel 706, the audio CD is the 14-track album "Earthling" by David Bowie.

When network access is available, meta data regarding an audio source (such as artist, album, track titles, song, genre information, release date, etc.) can be retrieved from online services over the network (e.g., the Internet) at any time. If network access is not available, but a local database storing such meta data is available, then the meta data regarding the audio source can be retrieved from the local database. If network access is not available, and a local database of meta data is not available, then an identifier of the audio source is stored so that the meta data can be retrieved at a later time, as discussed in more detail below.

Descriptive text 708 (i.e., "n items") is positioned beside the main legend "Music Collection" to indicate the number of titles in the music collection. The list 702 displays a limited number of music titles (e.g., eight titles). When a user first enters the music collection after purchasing their console, there will be zero titles in the music collection (i.e., "0 items"). In this situation, the music collection menu 700 is bypassed and the user is navigated to the music player screen (shown and described below with respect to FIG. 8). The title of the music player screen is "no audio CD" and all of the playback buttons in the area are disabled. The user may only navigate back to the main menu 500 (FIG. 5).

If the user only has a single audio disc in the portable media drive, or a single soundtrack in the music collection, the user is automatically navigated past the music collection menu 700 when coming from the main menu and is taken directly to the music player screen. As the user creates multiple soundtracks and stores them in the hard disk drive, the music collection menu 700 is no longer bypassed, but instead presents the available soundtracks in the list 702. When the descriptive text 708 indicates that there are more music titles than shown on list 702 (e.g., n>8), up/down scroll arrows are added to the list 702 to represent that more titles are available.

The user can move among music titles in list 702 by using the up and down directions of the thumbstick, or some other pre-defined control mechanism. The list 702 may be configured to wrap or not wrap when the user reaches the top or the bottom of the list. A select element 710 enables user selection of the highlighted title from list 702 using the "A" button on the controller. Selection of a game title navigates the user to the music player menu. A back element 712 facilitates navigation back to the main menu UI 500 by pressing the "B" button on the controller.

Figure 8:
FIG. 8 illustrates a graphical user interface depicting a music player that is accessible from the music collection menu.

FIG. 8 illustrates a graphical user interface depicting an example music player 800 that is accessible from the music collection menu or, where no music titles are listed, upon loading a music disc. The music player allows the user to play back the current audio disc in the portable media drive 106 or previously created soundtracks. The music player 800 includes a track list 802 of the available audio tracks and corresponding track lengths, an orb 804 that contains a radial spectrum analyzer (or other music related visual), and a status element 806 that displays the current playback status and timeline of the current track. During audio playback, the current track being played within the track list 802 is highlighted. If meta data regarding the tracks is available, track-specific information (e.g., song titles) may be displayed rather than the notation "Track x"). The status element 806 renders the following information for the user:

Current time within the current track
   Visual progress bar for the current track
   Simple playback icons to denote playback status (e.g., play, pause, stop, repeat, random)

A transport control panel 812 is displayed along the bottom of the music player for playback control. An example control panel 812 includes a play/pause button, a stop button, a skip forward button, a skip back button, a random track selection button, and a repeat button. When the user first navigates into the music player from the main menu or the music collection, the play button in the transport control panel 812 is in focus by default. Buttons on the game controller 104 may be mapped to the transport control buttons. For example, a white button on the controller might be mapped to the play/pause toggle button, the black controller button might be mapped to the stop button, the left trigger might be mapped to the previous track button, and the Right trigger might be mapped to the next track button.

A "copy song" button 816 is also displayed in the music player UI 800. When the copy song button 816 is selected, the user is navigated into the soundtrack creation tool with the current audio disc or soundtrack as the source. The soundtrack creation tool allows one or more tracks to be copied to a soundtrack. The soundtrack creation tool is discussed in greater detail below.

A select element 808 enables user selection of the highlighted audio track from list 802 using the "A" button on the controller. A back element 810 facilitates navigation back to the previous menu by pressing the "B" button on the controller.

Figure 9:
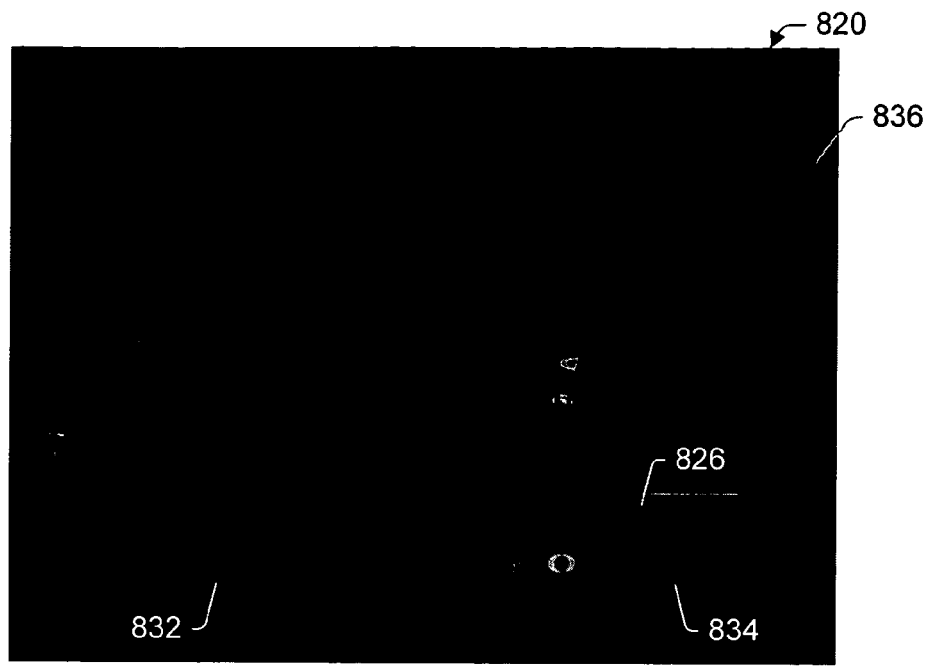
FIG. 9 illustrates a graphical user interface depicting another example music player.

FIG. 9 illustrates a graphical user interface depicting another example music player 820. Music player 820 can be accessible from the music collection menu, upon loading a music disc, or may be accessible from some other location or user interface. Similar to music player 800 of FIG. 8, music player 820 allows the user to play back the current audio disc in the portable media drive 106 or previously created soundtracks. The music player 820 includes a status element 826 that displays the current playback status and timeline of the current track.

A transport control panel 832 is displayed along the bottom of the music player for playback control. An example control panel 832 includes a play/pause button, a stop button, a skip forward button, a skip back button, a repeat button, a random track selection button, and a disc eject button. When the user first navigates into the music player 820, the play button in the transport control panel 832 is in focus by default. Buttons on the game controller 104 may be mapped to the transport control buttons. For example, a white button on the controller might be mapped to the play/pause toggle button, the black controller button might be mapped to the stop button, the left trigger might be mapped to the previous track button, and the Right trigger might be mapped to the next track button.

Additional buttons may also be included in a display control panel 834 to alter what is displayed to the user during playback of the audio track(s). Examples of display control buttons that may be included in the display control panel 834 include a spectrum analyzer button that causes a graphical representation of the audio waveform output during playback of the audio track(s) to be displayed, a track list display button that causes a list of the tracks of the current audio disc in the portable media drive 106 or a soundtrack to be displayed, a reduce button to reduce the size of a track list being displayed (or remove the track list from the display, leaving transport control panel 832, status element 826, and display control panel 834 as illustrated in FIG. 9), a photo album button that causes digital images and/or digital video to be displayed during playback of the audio track(s), a karaoke button that causes the lyrics of the audio track(s) to be displayed during playback of the audio track(s), and a button that changes the background 836 on which the transport control panel 832, status element 826, and display control panel 834 are overlaid as illustrated in FIG. 9. Buttons on the game controller 104 may be mapped to the display control buttons.

Although not shown in FIG. 9, a track list of the available audio tracks and corresponding track lengths of the current audio disc in the portable media drive 106 or of a soundtrack can be displayed. During audio playback, the current track being played within the track list can be highlighted. Additionally, if meta data regarding the tracks is available, track-specific information (e.g., song titles) may be displayed in the track list.

Figure 10:
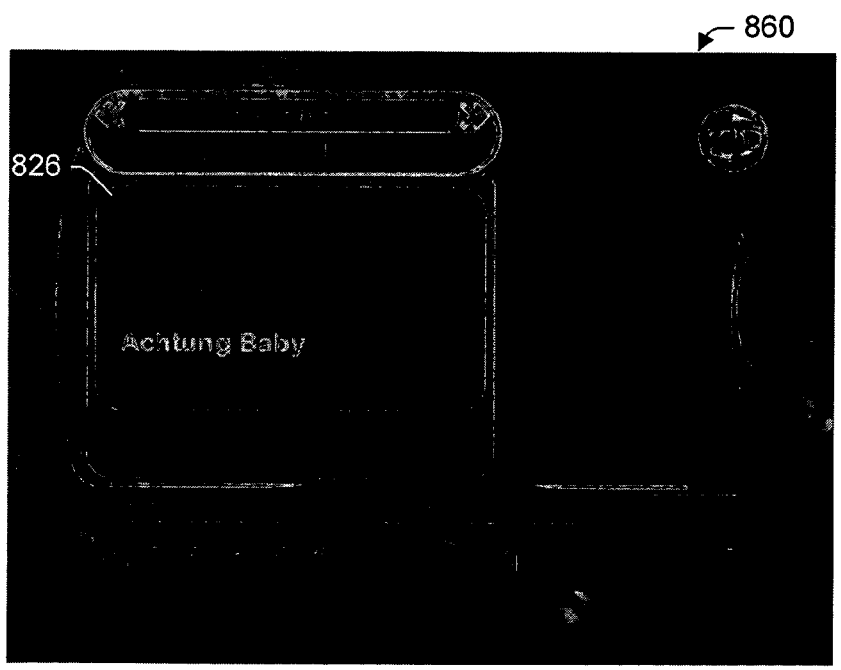
FIG. 10 illustrates a graphical user interface depicting another example music collection menu.

FIG. 10 illustrates a graphical user interface depicting another example music collection menu 860. Music collection menu 860 may be presented upon selection of music element 504 in the main menu UI 500, or alternatively upon selection of some other user interface element or running of some other program. Although the display is different, music collection menu is similar to music collection menu 700 of FIG. 7, allowing the user to select from available audio discs in the portable media drive 106 as well as soundtracks that have been previously created and stored on the hard disk drive 208.

The music collection menu 860 includes a list 862 of the available audio discs in the portable media drive (if any) and soundtrack files on the hard disk drive. An example of a suitable audio disc is a Redbook audio CD (compact disc). An example of a suitable soundtrack file is one or more WMA files copied from an audio CD, an audio DVD, a game disc, an online source, or other audio source. When there are more music titles than shown on list 862 (e.g., greater than 6), up/down scroll arrows (not shown) can be added to the list 862 to represent that more titles are available.

Although not illustrated in FIG. 10, when available meta data regarding an audio source may also be displayed in music collection menu 860. For example, an additional meta data panel may be displayed that displays meta data regarding the currently highlighted disc or soundtrack in list 862. When network access is available, meta data regarding an audio source (such as artist, album, track titles, song, genre information, release date, etc.) can be retrieved from online services over the network (e.g., the Internet) at any time. If network access is not available, but a local database storing such meta data is available, then the meta data regarding the audio source can be retrieved from the local database. If network access is not available, and a local database of meta data is not available, then an identifier of the audio source is stored so that the meta data can be retrieved at a later time, as discussed in more detail below.

The user can move among music titles in list 862 by using the up and down directions of the thumbstick, or some other pre-defined control mechanism. The list 862 may be configured to wrap or not wrap when the user reaches the top or the bottom of the list. One or more buttons on the game controller 104 may be mapped to the selection of highlighted title from list 862 (e.g., using the "A" button on the controller). Selection of a game title navigates the user to a music player menu.

In the illustrated example of FIG. 10, list 862 overlays a display of other information (e.g., a track list, the transport control panel 832, status element 826, and display control panel 834 discussed above with respect to FIG. 9).

Figure 11:
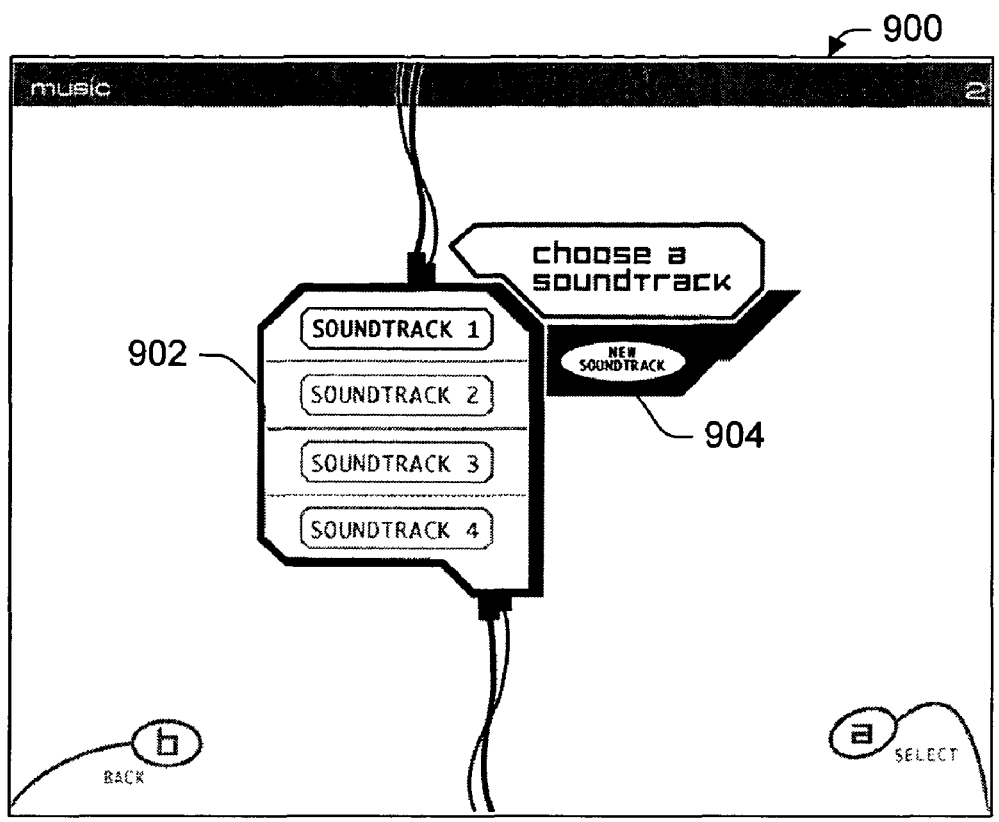
FIG. 11 illustrates a graphical user interface depicting a screen display used to select an existing soundtrack or create a new soundtrack.

FIG. 11 illustrates a graphical user interface depicting an example screen display 900 used to select an existing soundtrack or create a new soundtrack. As noted above, users can create their own soundtracks by copying audio tracks from one or more audio sources. Screen display 900 provides users with a list 902 of all soundtracks available to the gaming system. Such soundtracks may be stored on the hard disk drive 208, a portable disc medium 108 in drive 106, a memory unit 140, or at remote storage 308 at an online source 304. If the user has created at least one soundtrack, the list 902 depicts one or more placards of available soundtracks. A user entered name, or a default name "soundtrack 1", "soundtrack 2", etc., is shown on the placards.

A "New Soundtrack" button 904 is positioned beside the list to enable the user to create a new soundtrack. Upon selection of a soundtrack in the list 902 or the "New Soundtrack" button 904, the user is navigated to a track selection screen described below with respect to FIG. 14. If the user has not yet created a soundtrack, the list 902 of available soundtracks is empty. Upon choosing the "New Soundtrack" button 904, the user is presented with an area for text entry and a virtual keyboard for typing a new name for the soundtrack. By default, the name given to the soundtrack will be "Soundtrack 1", but any keyboard input from the user will replace this default title with the entered name.

Figure 12:
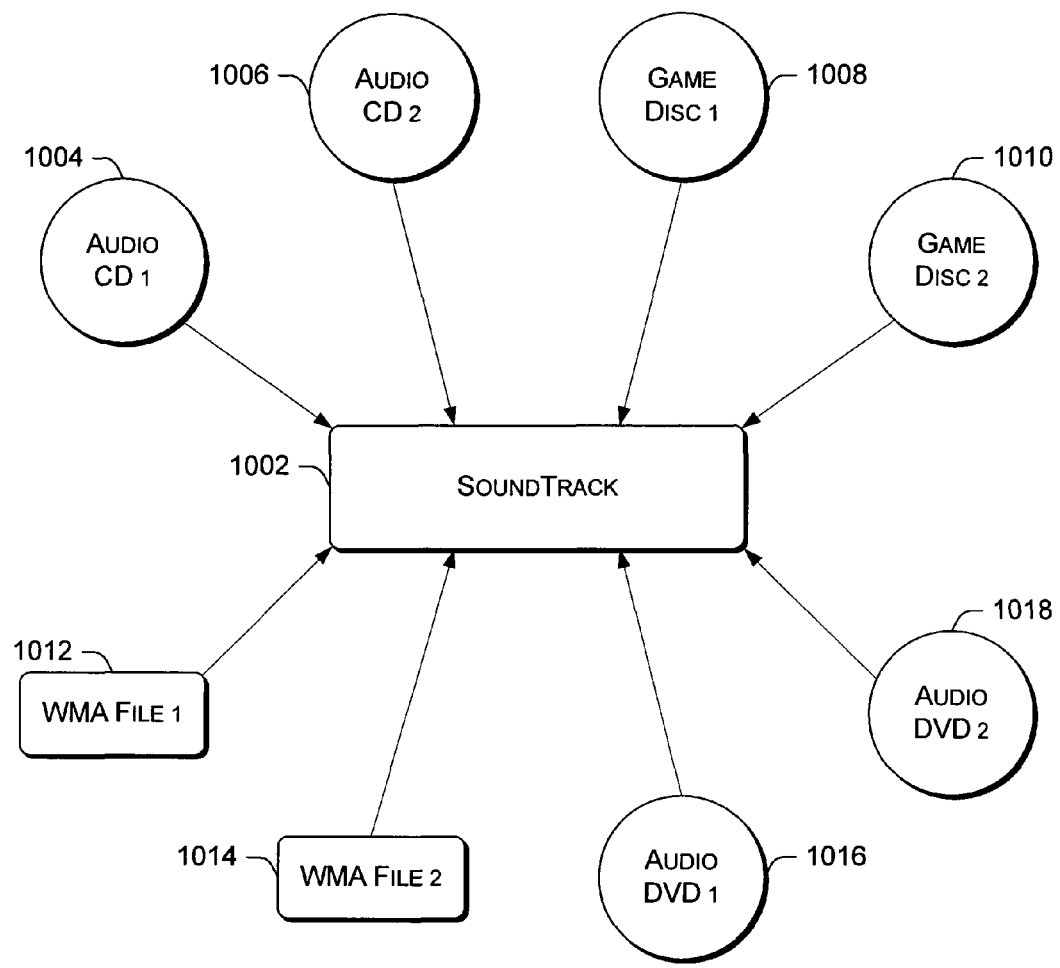
FIG. 12 illustrates the creation of a soundtrack using a variety of different audio sources.

FIG. 12 illustrates the creation of a soundtrack using a variety of different audio sources. A new soundtrack 1002 is created by selecting audio tracks from one or more different audio sources. Examples of audio sources illustrated in FIG. 12 include audio CDs 1004 and 1006, game discs 1008 and 1010, WMA files 1012 and 1014, and audio DVDs 1016 and 1018. Although a limited number of audio sources are illustrated in FIG. 12, soundtrack 1002 can be created using audio tracks from any number of audio sources that represent any number of artists. The audio tracks that comprise soundtrack 1002 can be arranged in any order, regardless of the audio source or the time at which the audio track was retrieved or copied.

Audio CDs 1004 and 1006 typically include multiple audio tracks. Soundtrack 1002 may contain one or more audio tracks from one or more audio CDs. Game discs 1008 and 1010 may contain one or more audio tracks that are played during the game. One or more of those audio tracks may be included in the user-created soundtrack 1002. WMA files 1012 and 1014 may be stored locally on the hard disk drive or available from an online source. Each WMA file may contain one or more audio tracks. One or more audio tracks from one or more WMA files may be included in soundtrack 1002. Additionally, one or more MPEG Layer 3 (MP3) audio files (not shown) may be included in soundtrack 1002. MP3 files may be stored locally on the hard disk drive or available from an online source. Audio DVDs 1016 and 1018 typically include multiple audio tracks. Soundtrack 1002 may include one or more audio tracks from one or more audio DVDs.

Figure 13:
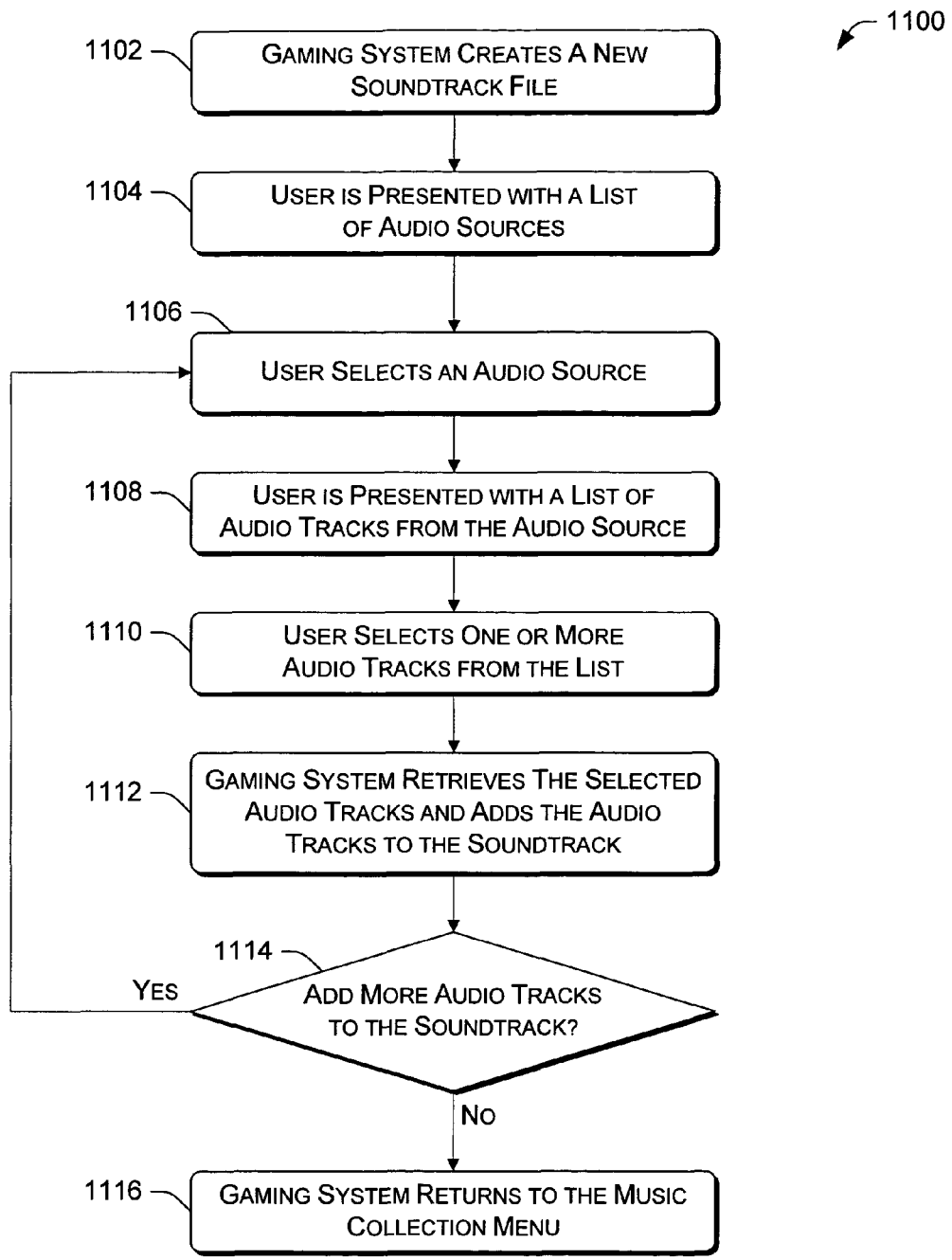
FIG. 13 is a flow diagram illustrating a process for creating a new soundtrack.

FIG. 13 is a flow diagram illustrating a process 1100 for creating a new soundtrack. The process 1100 is implemented in software as computer-executable instructions that are executed by the CPU 200 to perform the operations illustrated as blocks. Initially, the gaming system 100 creates a new soundtrack file to receive the selected audio tracks (block 1102). The user is given the opportunity to name the soundtrack. If the user does not provide a name, a default name "Soundtrack n" is applied to the soundtrack. The default name can later be changed by the user.

At block 1104, the console application 260 presents a list of audio sources from which to retrieve or copy audio tracks. Next, the user selects an audio source from the list of audio sources (block 1106). The console application 260 then presents a list of audio tracks available from the selected audio source (block 1108). The user then selects one or more audio tracks from the list to include in the soundtrack (block 1110). At block 1112, the console application 260 retrieves the selected audio tracks and adds the audio tracks to the soundtrack. If necessary, the console application 260 converts the retrieved audio files into WMA format. For example, audio tracks from an audio CD or an audio DVD are converted from their native format into WMA format prior to adding the audio tracks to the soundtrack. Similarly, MP3 files are converted from MP3 format to WMA format before adding the audio tracks to the soundtrack.

At block 1114, the console application 260 determines whether more audio tracks are to be added to the soundtrack. This determination is performed, for example, by querying the user as to whether they want to add more tracks. If additional tracks are to be added to the soundtrack, the process 1100 returns to block 1104, where the user is presented with a list of audio sources. Alternatively, the process 1100 may return to block 1106, which allows the user to select another audio track from the same audio source as the previous selection.

After all audio tracks have been added to the soundtrack, the process 1100 returns to the music collection menu (block 1116) shown in FIG. 7 (or alternatively FIG. 10). At this point, the music collection menu displays the newly created soundtrack in the list of available soundtracks.

Each user of a game console 102 can have their soundtracks stored separately from the soundtracks created by other console users. For example, when a user completes the creation of a new soundtrack, the soundtrack is stored in an area on the hard disk drive associated with that user or a user attribute is stored with the soundtrack indicating the creator of the soundtrack. Thus, when a particular user identifies themselves to the game console, the game console displays the soundtracks created by that particular user.

Figure 14:
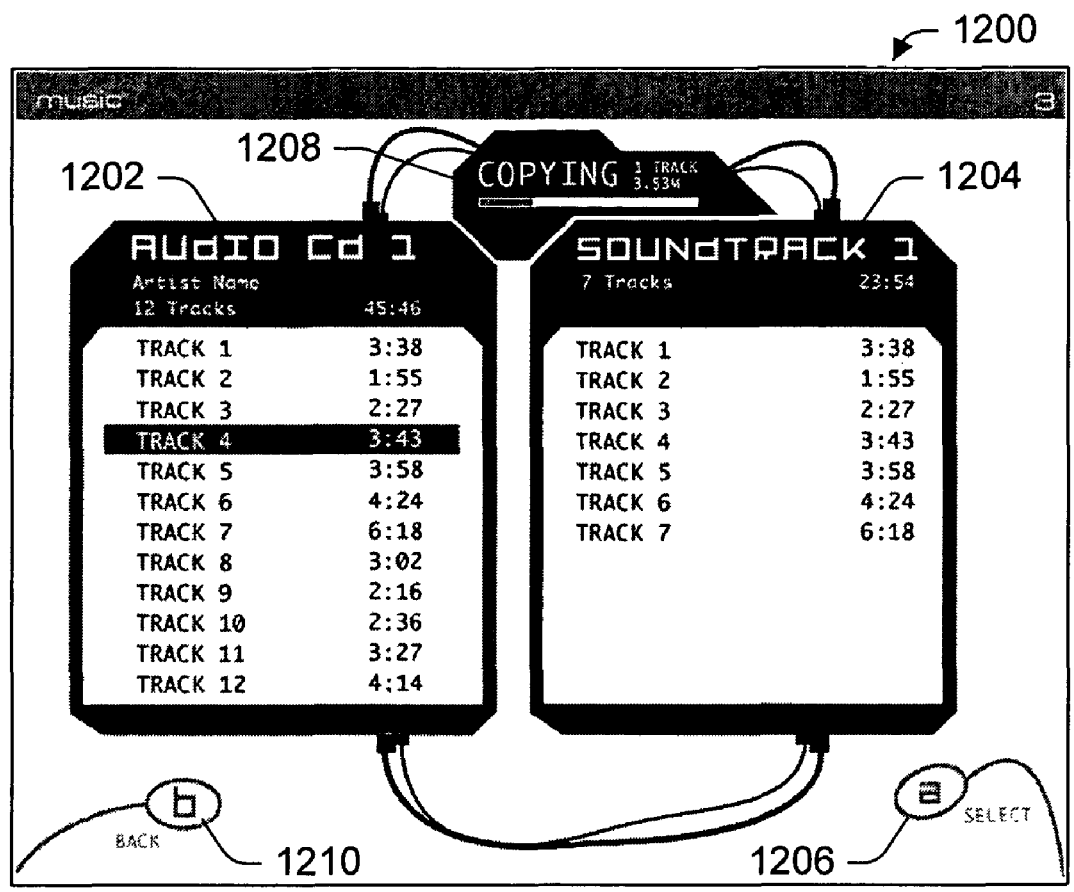
FIG. 14 illustrates a graphical user interface depicting a screen displayed during the creation of a soundtrack.

FIG. 14 illustrates a graphical user interface depicting an example audio track selection screen 1200 displayed during the creation of a soundtrack. Audio track selection screen 1200 includes a list 1202 of available audio tracks (e.g., from an audio disc or an online source), and a corresponding list 1204 of audio tracks that are already in the soundtrack. The user then selects a single audio track, or multiple tracks, to be included in the soundtrack. The screen 1200 also depicts a status area 1208 that identifies the progress of the total operation. The ordering of the audio tracks in list 1204 can be adjusted by dragging a particular audio track to the desired location in the list and releasing the audio track. The list 1204 is then reordered to reflect the new location of the audio track.

A particular implementation of the audio track selection screen may include a "name soundtrack" button that allows the user to assign a name to the soundtrack. The name can be entered using a virtual keyboard or other character input mechanism. The audio track selection screen may also include a delete button that allows the user to delete a particular song from the soundtrack.

After the soundtrack is completed, a select element 1206 is activated by using the "A" button on the controller. This select element causes the system to navigate back to the music collection menu. A back element 1210 facilitates navigation back to the previous menu by pressing the "B" button on the controller.

If the user cancels a file copy operation, those audio files being copied or retrieved will be lost. If a power off occurs while creating a soundtrack, any audio files being copied or retrieved will not be included in the soundtrack.

In a particular implementation, soundtracks are stored as one or more WMA files on the gaming system 100. Specifically, WMA files for soundtracks are stored in a flat directory on the hard disk drive 208. This directory also contains a text data file that maintains a reference of all WMA files, as well as the soundtracks to which each WMA file belongs. Because the game console manages the soundtrack directory, it is possible to keep this data file up to date. An API (application program interface) may be used to allow a game to query such information as the list of available soundtracks, the first audio file of a specific soundtrack, the last audio file of a specific soundtrack, and the next audio file in a specific soundtrack. Alternatively, the WMA files for each soundtrack may be stored in a separate folder (which may result in copies of the same WMA file existing in multiple folders).

Figure 15:
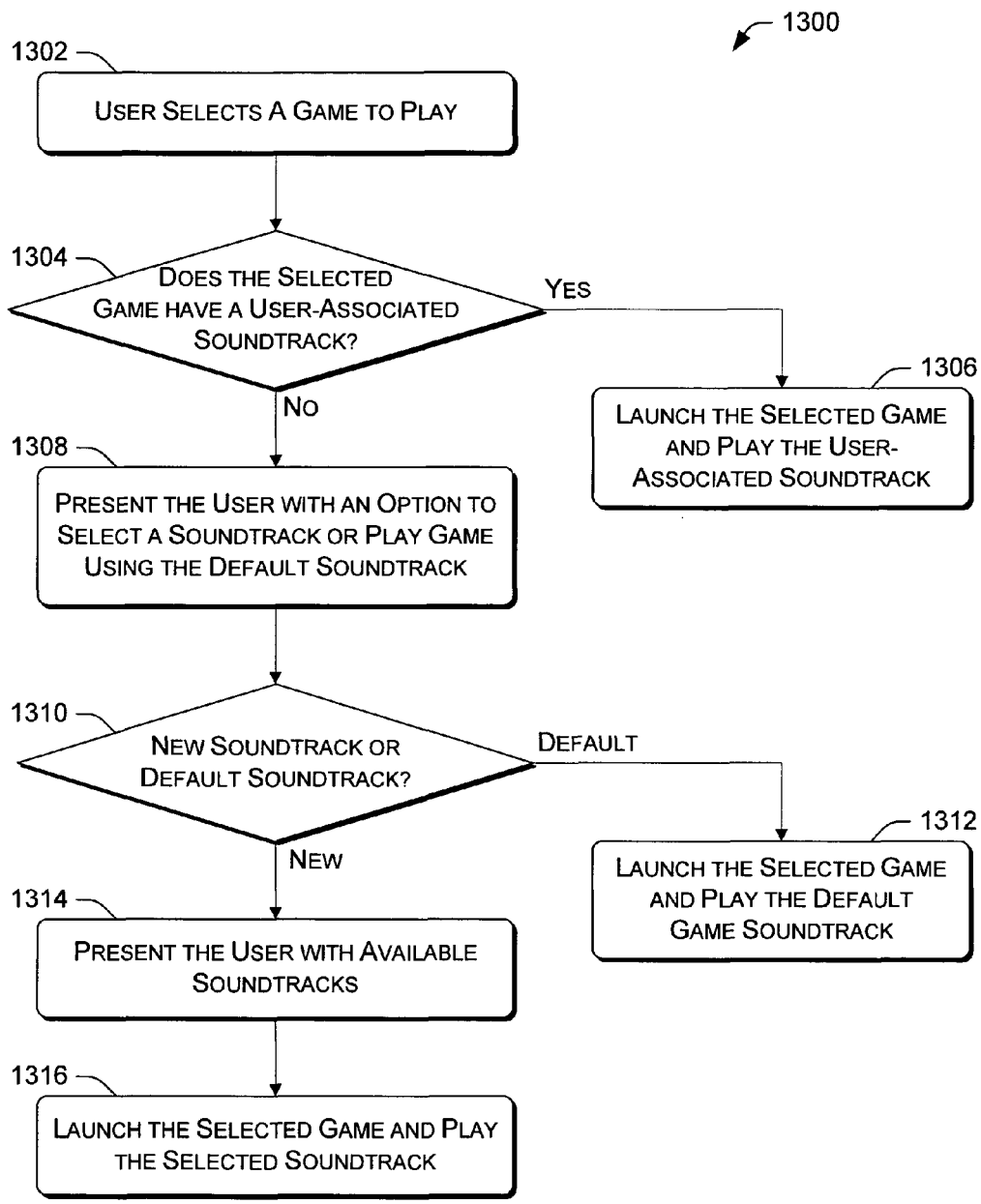
FIG. 15 is a flow diagram illustrating a process that determines which soundtrack to play when a particular game is launched.

FIG. 15 is a flow diagram illustrating a process 1300 that determines which soundtrack to play when a particular game is launched. The process 1300 is implemented in software as computer-executable instructions that are executed by the CPU 200 to perform the operations illustrated as blocks. When a user plays a game, the user can choose to listen to the game's default soundtrack or listen to a different soundtrack. If the user becomes tired of the game's default soundtrack, the user can create a new soundtrack and associate that soundtrack with the game title such that the new soundtrack is played when the game is launched instead of the game's default soundtrack. This new soundtrack is referred to as a "user-associated soundtrack."

The process 1300 begins when a user selects a game to play (block 1302). The game may be selected, for example, by inserting a game disc in the portable media drive 106, by selecting a game from list of games stored on the hard disk drive 108, or by selecting a game from an online source. The console application 260 determines whether the selected game has a user-associated soundtrack (block 1304). If the selected game has a user-associated soundtrack, the game is launched and the user-associated soundtrack is played during the execution of the game (block 1306).

If the selected game does not have a user-associated soundtrack, the console application 260 presents the user with an option to select a soundtrack or play the game using the default soundtrack (block 1308). Next, the console application 260 determines whether the user selected a soundtrack or the default soundtrack (block 1310). If the user selects the default game soundtrack, the game is launched and the default game soundtrack is played during the execution of the game (block 1312). If the user selects to choose a soundtrack, the user is presented with the available soundtracks stored on the gaming system (block 1314). The game is then launched and the selected soundtrack is played during the execution of the game (block 1316).

When the user selects a soundtrack to play instead of the default soundtrack, the user is presented with the option of making the soundtrack change "permanent." If the change is made permanent, the selected soundtrack will be played instead of the default soundtrack each time the game is played. Thus, the user is not required to select the new soundtrack each time the game is played the system will remember the new soundtrack until the user specifically changes the soundtrack or specifically requests the gaming console to begin using the default game soundtrack.

Since the soundtrack is played from the hard disk drive, the playback of the soundtrack does not interfere with the execution of the game from the game disc. The game disc remains in the game console while the soundtrack executes, thereby eliminating the game disruptions that would occur if the game disc was removed and replaced with an audio CD. The user can change soundtracks in the middle of a game by pausing the game and selecting a different soundtrack. The game is then "un-paused" and game play continues at the point where the game was previously paused. The new soundtrack is played back from the hard disk drive while the game executes from the game disc.

Returning to FIG. 12, audio sources (particularly audio CDs and audio DVDs) frequently have meta data associated with them. This meta data can include various information about the content of the audio sources, such as artist information (e.g., name, history, biographies, past and/or present members of a group, etc.), release date of the content (e.g., an album release date), song titles, song composer and/or arranger information, lyrics, album cover art, and so forth. This meta data is frequently stored somewhere other than the audio source (e.g., the meta data for a particular audio CD may be part of a database of meta data for many different audio sources that is stored on a network server rather than on the audio CD). When available, this information or selected portions of it can be presented to the user to enhance the user's experience. For example, song titles in a soundtrack can be displayed to the user rather than simply displaying "Track x".

Many audio sources have an identifier associated with them that allow the audio source to be uniquely (or almost uniquely) identified. This identifier may be an actual identifier that is part of the audio source (e.g., an alphanumeric string stored on a CD or DVD), or alternatively may be generated based on the contents of the audio source. Depending on the manner in which the identifier is generated, the identifier may or may not be unique, but the situation of two audio sources having the same identifier should be at least unlikely. Additionally, audio source identifiers may be generated in different manners for different audio sources (e.g., for different audio CDs) or different types of audios sources (e.g., for audio CDs and audio DVDs).

By way of example, audio CDs are typically uniquely identified by using what is referred to as table of contents (TOC) information. Audio CDs typically store songs as different tracks on the CD, and each track is made up of multiple "frames" of audio data. In one implementation, each frame of audio data is 1/75 of a second of audio data. The table of contents information refers to: the total number of tracks on the disc, the starting frame offset of each track, and the total number of frames on the disc.

By way of another example, an identifier for a DVD may be generated based on a CRC 64 (64-bit Cyclical Redundancy Checking) of portions of the DVD. In one implementation, these portions are the first parts (e.g., 64 Kb) of the video_ts.ifo and the vts_01_0.ifo on a DVD disc.

In order to make use of such meta data, when an audio track is stored on the game console 102, the identifier of the audio source as well as an indication of the particular audio track of the audio source is stored on the game console 102. The audio source identifier and the audio track indicator are associated with that audio track on the game console 102. This association can be performed in different manners. In one particular implementation, the audio source identifier and the audio track indicator are stored as part of the same WMA file as the audio track. In another implementation, the audio source identifier and the audio track indicator are stored separately (e.g., in a table or database that stores the audio source identifier, audio track indicator, and a pointer or link to (or other identifier of) the audio track on the game console 102).

An audio source identifier and audio track indicator are also stored when an audio track is added to a soundtrack, regardless of whether the audio track is stored on the game console. Additionally, it should also be noted that the audio source identifier and audio track indicator may be stored in various locations, such as on the internal hard disk drive of game console 102, or somewhere other than the game console 102 (such as on some remote server accessed over a network, or on a memory unit 140).

Storing the audio source identifier and the audio track indicator on the game console 102 allows the meta data associated with the audio track to be retrieved at a later time, even though the audio source may no longer be accessible to the game console 102 (e.g., an optical disc may be removed from the game console 102). The later time at which the meta data is retrieved can vary. For example, the later time may occur when a database is available locally to game console 102 (e.g., on an optical disc). By way of another example, the later time may occur when a program is subsequently installed and executed on game console 102 (e.g., no program on game console 102 may display the meta data when the audio source identifier and audio track indicator are stored on game console 102, but such a program may subsequently be installed on game console 102). By way of yet another example, the later time may occur when Internet access is available and an online service that maintains the meta data is accessible via the Internet.

Figure 16:
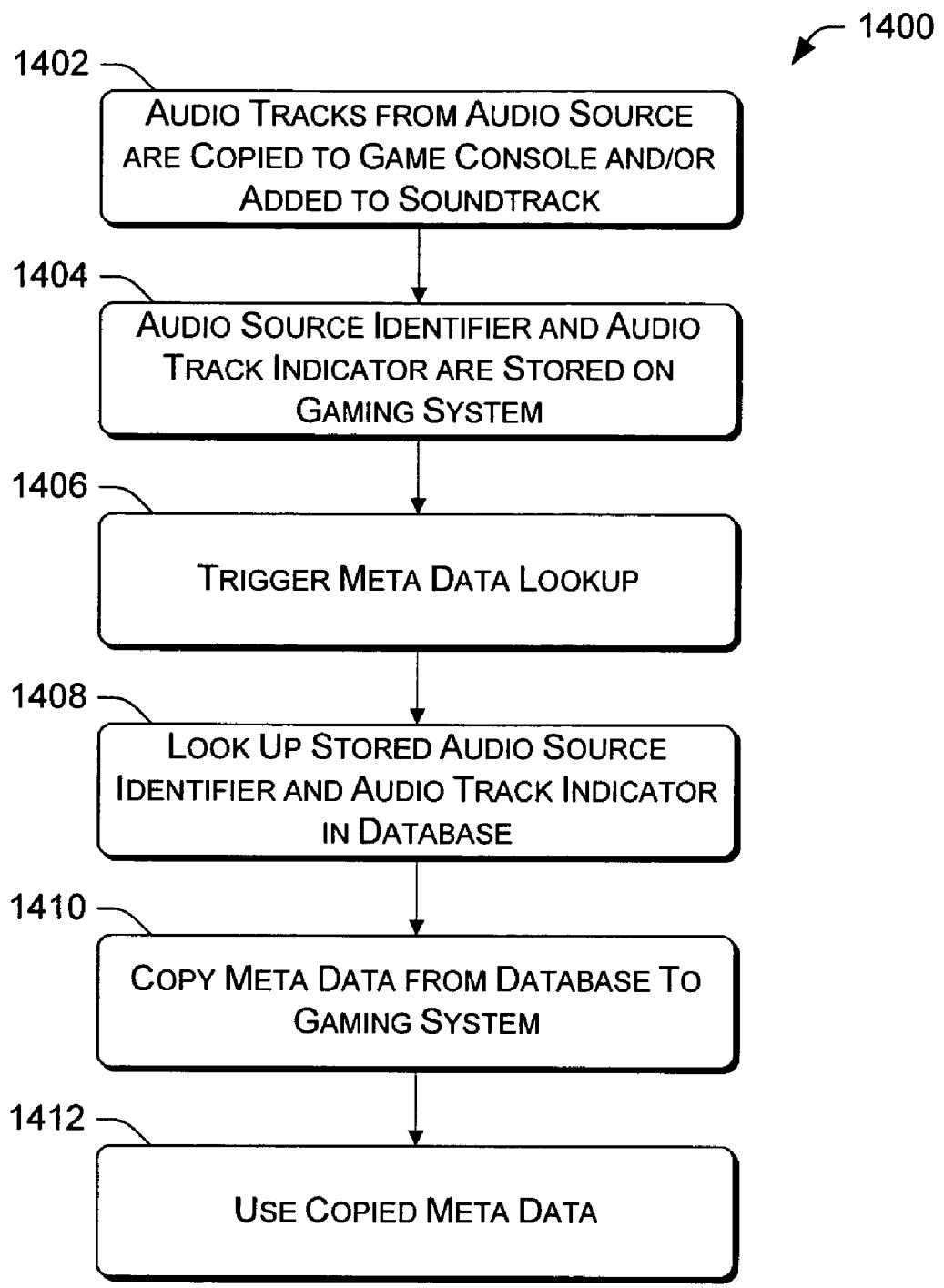
FIG. 16 is a flow diagram illustrating an example process that adds meta data to the gaming system.

FIG. 16 is a flow diagram illustrating an example process 1400 that adds meta data to the gaming system. The process 1400 is implemented in software as computer-executable instructions that are executed by the CPU 200 to perform the operations illustrated as blocks.

The process 1400 begins when audio tracks are copied from an audio source to the game console 102, or alternatively when the audio tracks are otherwise added to a soundtrack (block 1402). The copying in block 1402 can be, for example, the copying of audio tracks to the game console 102 when creating a soundtrack as discussed above. In addition to copying the audio tracks, the audio source identifier and the audio track indicator are also stored on the game console 102 (block 1404).

At some later time, a meta data lookup is triggered (block 1406). This trigger may be the installation of a particular program on the game console 102 that uses the meta data (e.g., some future application that may or may not be identified at the time the audio track(s) are copied), the coupling of the game console 102 to the Internet, the accessibility of a local database of meta data, and so forth. The meta data lookup may be triggered when a particular audio track is accessed (e.g., when the user selects a particular soundtrack, the meta data lookup may be performed for the audio track(s) in that soundtrack), or alternatively may be performed in the background when the meta data is available (e.g., as soon as a local database of meta data is available, the game console 102 may operate to check the audio track(s) stored on the game console 102 to determine whether there is meta data in the database for that audio track(s)).

When the meta data lookup is triggered, the database of meta data is accessed and the audio source identifier and audio track indicator are used to look up in the database the meta data for the audio track (block 1408). The meta data from the database that is associated with the audio track is then copied from the database to the gaming system 100 (block 1410). Once copied to the gaming system 100, the meta data can be used by the game console 102 (block 1412).

After the meta data is copied to the game console 102, the meta data is associated with a particular track that is stored on the game console and/or is part of a soundtrack. The meta data can be stored as part of the soundtrack file, as part of the same WMA file as the audio track, or alternatively elsewhere (e.g., as a record in a table or database that stores the meta data and a pointer or link to (or other identifier of) the audio track on the gaming system 100). The meta data can be stored using any of a variety of data structures.

It should be noted that process 1400 of FIG. 16 can be used for audio tracks that are part of a soundtrack as well as audio tracks that are not part of a soundtrack. For example, process 1400 can be used with audio tracks that are copied to the game console 102 for playback by game console 102 but that are not included in any soundtrack at game console 102.

The manner in which the meta data is used by the game console 102 can vary. In one implementation, the meta data is used to create an enhanced user experience when using soundtracks. FIGS. 17A and 17B illustrate example screens displayed to identify the audio tracks in a soundtrack. Screen 1502 of FIG. 17A identifies eight tracks that are part of a soundtrack. Screen 1504 of FIG. 17B identifies the same eight tracks that are part of the same soundtrack, but meta data has been incorporated into the screen so that the song titles for each of the eight tracks is displayed. Screen 1504 may be displayed, for example, as list 1204 of FIG. 14. Displaying the song titles to the user can enhance the user's experience because it allows, for example, the user to view and select audio tracks based on the song titles rather than requiring the user to remember which song a particular track is.

Figure 18:
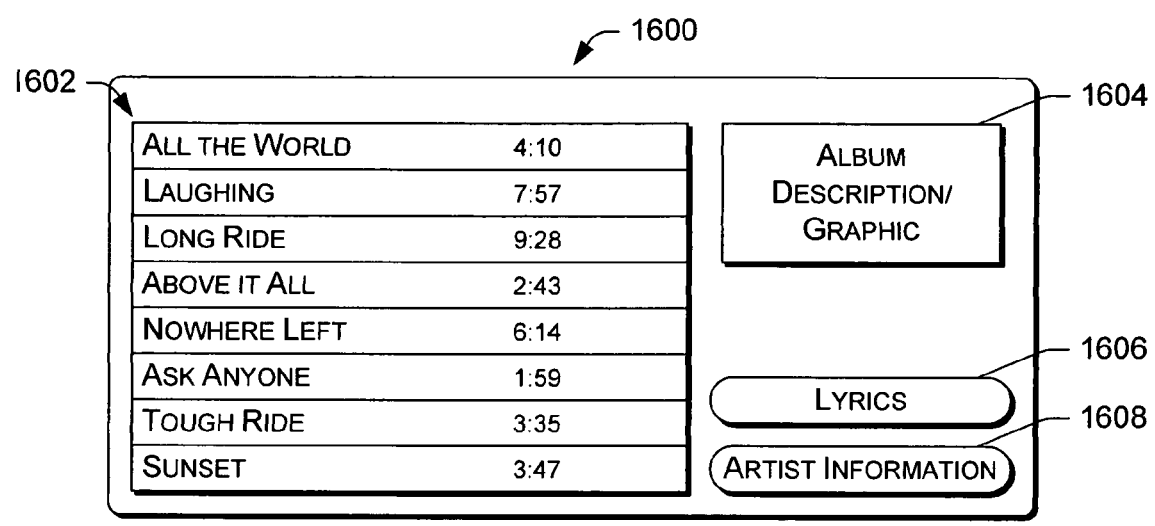
FIG. 18 illustrates another example screen.

FIG. 18 illustrates another example screen 1600. Screen 1600 may be displayed when a soundtrack is being displayed, or alternatively at other times (e.g., as part of a graphical user interface depicting a music player). Screen 1600 includes a list 1602 of multiple audio tracks using retrieved meta data (e.g., the song titles as illustrated). Screen 1600 also includes an album description or graphic portion 1604 in which information describing an album which contains one or more of the audio tracks in list 1602 (even though the track may have been previously copied from the audio source and is no longer available to the gaming system).

Screen 1600 also includes user-selectable buttons 1606 and 1608, each of which may be selected, for example, by using a button or trigger on the controller. Selection of button 1606 causes lyrics for one or more of the audio tracks in list 1602 to be displayed (e.g., as part of a separate screen or as part of screen 1600, such as in portion 1604). Selection of button 1608 causes information about the artist of one or more of the audio tracks in list 1602 to be displayed (e.g., as part of a separate screen or as part of screen 1600, such as in portion 1604).

It should be noted that the database that stores the meta data may change over time. For example, as new audio CDs are released, meta data corresponding to those new audio CDs would be added to the database. In situations where the database of meta data is maintained locally at the gaming system, updates to the database may be performed at regular or irregular intervals. For example, weekly or monthly updates may be retrieved over the Internet, or discs with the updates may be mailed (e.g., using the postal service) to the user of a gaming system.

It should also be noted that a user may generate his or her own meta data and add that meta data to the database, or alternatively to a meta data record associated with a particular track that is stored on the game console. By way of example, the meta data associated with an audio track may include one or more genres into which the audio track is classified. These genres may include a classification that is made by the artist of the audio track (e.g., a genre of "rock"), and/or a classification that is made by the user (e.g., a genre of "racing" for racing games, or a genre of "fighting" for fighting games). By way of another example, user-defined song titles may be included in the meta data, or other user-defined comments or remarks.

Thus, it can be seen that the information identifying an audio source and a particular track of that audio source is stored by the gaming system until such time as it is needed to retrieve meta data for the audio track.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method, implemented in a game console, the method comprising:
    obtaining an audio track from an audio source;
    saving the audio track without saving at least some meta data associated with the audio track on a storage device of the game console, so that a copy of the audio track is available when the audio source is no longer accessible to the game console, wherein the audio track is at least part of a user-created soundtrack;
    saving an identifier of the audio source on the storage device;
    after saving the audio track, determining when an online service that provides a database containing meta data associated with the audio track is available,
    connecting to the online service, obtaining the meta data associated with the audio track from the database and storing the meta data associated with the audio track on the storage device, wherein the meta data is obtained from the online service based at least in part on the identifier saved on the storage device;
    associating the user-created soundtrack with a game application;
    executing the game application on the game console; and
    during execution of the game application, playing the user-created soundtrack and displaying information regarding the soundtrack based on the meta data.

2. A method as recited in claim 1, wherein the storage device comprises an internal hard disk drive of the game console.

3. A method as recited in claim 1, wherein the database is stored on the storage device.

4. A method as recited in claim 1, further comprising:
    saving an indicator of the audio track; and
    wherein the meta data is obtained based at least in part on both the saved identifier and the saved indicator on the storage device.

5. A method as recited in claim 1, wherein the audio source comprises an audio CD.

6. A method as recited in claim 1, wherein the audio source comprises an audio DVD.

7. A method as recited in claim 1, wherein the identifier of the audio source comprises table of contents (TOC) information for the audio source.

8. A method as recited in claim 1, wherein at least a portion of the metadata is obtained from removable media readable by a media drive of the game console.

9. A method as recited in claim 8, wherein the removable media comprises an optical disc.

10. A computer-readable medium for a game console comprising computer-executable instructions that, when executed, direct the game console to:
    obtain an audio track from an audio source;
    save the audio track, without saving at least some meta data associated with the audio track, to a storage device of the game console, so that a copy of the audio track is available when the audio source is no longer accessible to the game console, wherein the audio track is at least part of a user-selected soundtrack;
    save an identifier of the audio source and the audio track;
    after the audio track is saved, determine when an online service that provides a database containing meta data associated with the audio track is available,
    connect to the online service when the online service is available, obtain the meta data associated with the audio track from the database and store the meta data associated with the audio track, wherein the meta data is obtained from the online service based at least in part on the identifier saved on a storage device;
    associating the user-selected soundtrack with a game application;
    executing the game application in the game console; and
    during execution of the game application playing the user-created soundtrack and displaying information regarding the soundtrack based on the meta data.

11. A computer-readable medium as recited in claim 10, wherein the storage device comprises an internal hard disk drive of the game console.

12. A computer-readable medium as recited in claim 10, wherein the database is stored on the storage device.

13. A computer-readable medium as recited in claim 10, wherein the instructions, when executed, further direct the game console to:
    save an indicator of the audio track; and
    wherein the meta data is obtained based at least in part on both the saved identifier and the saved indicator.

14. A computer-readable medium as recited in claim 10, wherein the audio source comprises an audio CD.

15. A computer-readable medium as recited in claim 10, wherein the audio source comprises an audio DVD.

16. A computer-readable medium as recited in claim 10, wherein the identifier of the audio source comprises table of contents (TOC) information for the audio source.

17. A computer-readable medium as recited in claim 10, wherein at least a portion of the metadata is obtained from a removable media readable by a media drive of the game console.

18. A computer-readable medium as recited in claim 17, wherein the removable media comprises an optical disc.

19. A method, implemented in a game console, the method comprising:
    copying an audio track from an audio source without copying at least some meta data associated with the audio track to a storage device of the game console, wherein the audio track is at least part of a user-selected soundtrack;
    using an identifier of the audio source to retrieve meta data associated with the audio track from a database over a network connection from an online service when the database is accessible;
    saving the identifier of the audio source on the game console when the database is not accessible and using the saved identifier to retrieve meta data associated with the audio track from the online service when the database is subsequently available;

associating the user-selected soundtrack with a game application;

executing the game application in the game console; and during execution of the game application playing the user-created soundtrack and displaying information regarding the soundtrack based on the meta data.

20. A method as recited in claim 19, further comprising:

saving, on the game console, an indicator of the audio track; and using both the saved identifier and the saved indicator to retrieve the meta data.

21. A method as recited in claim 19, wherein the audio source comprises an audio CD.

22. A method as recited in claim 19, wherein the audio source comprises an audio DVD.

23. A method as recited in claim 19, wherein the storage device comprises an internal hard disk drive of the game console.

24. A method as recited in claim 19, wherein the identifier of the audio source comprises table of contents (TOC) information for the audio source.

25. A method as recited in claim 19, wherein at least a portion of the metadata is obtained from a removable media inserted in the game console.

26. A method as recited in claim 25, wherein the removable media comprises an optical disc.

27. A computer-readable medium for a game console comprising computer-executable instructions that, when executed, direct the game console to:

copy an audio track from an audio source, without copying at least some meta data associated with the audio track, to a storage device of the game console, wherein the audio track is at least part of a user-created soundtrack;

after copying the audio track, use an identifier of the audio source to retrieve meta data associated with the audio track from a database over a network connection from an online service if the database is accessible;

save the identifier of the audio source on the game console if the database is not accessible;

executing a game application on the game console;

pausing execution of the game application in response to receiving a request to select a new soundtrack to playback during execution of the game application; and displaying information regarding the user-created soundtrack based on the meta data to assist a user in selecting the new soundtrack.

28. A computer-readable media as recited in claim 27, wherein the instructions further direct the game console to use the saved identifier to retrieve the metadata associated with the audio track when the database is subsequently available.

29. A computer-readable medium as recited in claim 28, wherein the instructions further direct the game console to:

save, on the game console, an indicator of the audio track; and use both the saved identifier and the saved indicator to retrieve the meta data.

30. A computer-readable medium as recited in claim 27, wherein the audio source comprises an audio CD.

31. A computer-readable medium as recited in claim 27, wherein the audio source comprises an audio DVD.

32. A computer-readable medium as recited in claim 27, wherein the storage device comprises an internal hard disk drive of the game console.

33. A computer-readable medium as recited in claim 27, wherein the identifier of the audio source comprises table of contents (TOC) information for the audio source.

34. A computer-readable medium as recited in claim 27, wherein at least a portion of the metadata is obtained from a removable media inserted in the game console.

35. A computer-readable medium as recited in claim 34, wherein the removable media comprises an optical disc.

* * * * *